United States Patent
Pandey et al.

(10) Patent No.: US 12,401,648 B2
(45) Date of Patent: Aug. 26, 2025

(54) ESTABLISHING USER DEVICE TRUST LEVELS

(71) Applicant: Box, Inc., Redwood City, CA (US)

(72) Inventors: Sanjiv Pandey, Hayward, CA (US); Kechen Huang, Menlo Park, CA (US); Kanav Gandhi, Sunnyvale, CA (US); Yi Zhao, Redwood City, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 17/390,153

(22) Filed: Jul. 30, 2021

(65) Prior Publication Data
US 2022/0086163 A1    Mar. 17, 2022

Related U.S. Application Data

(60) Provisional application No. 62/706,868, filed on Sep. 14, 2020.

(51) Int. Cl.
| | |
|---|---|
| H04L 29/06 | (2006.01) |
| G06F 21/62 | (2013.01) |
| H04L 9/40 | (2022.01) |
| G06F 1/329 | (2019.01) |
| G06F 9/48 | (2006.01) |

(52) U.S. Cl.
CPC ........ H04L 63/102 (2013.01); G06F 21/6245 (2013.01); G06F 1/329 (2013.01); G06F 9/4881 (2013.01); H04L 2463/082 (2013.01)

(58) Field of Classification Search
CPC ............ H04L 63/102; H04L 2463/082; G06F 21/6245
See application file for complete search history.

(56) References Cited

U.S. PATENT DOCUMENTS

| | | | |
|---|---|---|---|
| 7,346,668 B2 * | 3/2008 | Willis | G06F 16/9535 707/999.005 |
| 7,428,591 B2 * | 9/2008 | Stebbings | H04L 63/04 713/180 |

(Continued)

OTHER PUBLICATIONS

"Okta Device Trust solutions," Okta Help Center, date obtained via Internet Archives as May 7, 2021, URL: https://help.okta.com/en/prod/Content/Topics/device-trust/device-trust-landing.htm.

(Continued)

*Primary Examiner* — Shin-Hon (Eric) Chen
(74) *Attorney, Agent, or Firm* — Vista IP Law Group, LLP

(57) ABSTRACT

Methods, systems, and computer program products for content management systems. Multiple components are operatively interconnected to carry out operations for establishing a user device trust level. A content management system facilitates interactions between a plurality of user devices and a plurality of shared content objects. The plurality of user devices are network connected to the content management system. One of the user devices issues a request to access a particular one of the content objects. Responsive to the request, a two-step device check is performed before granting access to the particular one of the content objects. A first step of the two-step device check process is based on login information, and a second step of the two-step device check process is based at least in part on analysis of the content of the particular one of the content objects. The actual bits of the content object itself are inspected.

22 Claims, 12 Drawing Sheets

(56) References Cited

U.S. PATENT DOCUMENTS

| | | | |
|---|---|---|---|
| 7,434,048 B1 | 10/2008 | Shapiro et al. | |
| 8,640,251 B1* | 1/2014 | Lee | G06F 16/164 |
| | | | 707/786 |
| 9,979,500 B2* | 5/2018 | Raman | H04H 60/32 |
| 10,885,410 B1* | 1/2021 | Rule | G06Q 20/3276 |
| 10,949,382 B2* | 3/2021 | Hammer | G06F 16/13 |
| 11,327,665 B2* | 5/2022 | Gkoulalas-Divanis | |
| | | | G06F 3/0679 |
| 11,509,658 B1* | 11/2022 | Kulkarni | H04W 12/60 |
| 11,962,578 B2 | 4/2024 | Steeves et al. | |
| 2001/0023421 A1* | 9/2001 | Numao | G06F 21/6218 |
| | | | 707/999.009 |
| 2011/0014972 A1* | 1/2011 | Herrmann | G07F 17/3237 |
| | | | 463/25 |
| 2013/0227285 A1* | 8/2013 | Bracher | G06F 21/6218 |
| | | | 713/168 |
| 2014/0013422 A1* | 1/2014 | Janus | G06F 21/32 |
| | | | 726/19 |
| 2014/0129942 A1* | 5/2014 | Rathod | H04N 21/44226 |
| | | | 715/720 |
| 2015/0271267 A1* | 9/2015 | Solis | G06F 16/178 |
| | | | 709/213 |
| 2016/0179776 A1 | 6/2016 | Bartley et al. | |
| 2016/0188902 A1* | 6/2016 | Jin | H04W 4/029 |
| | | | 726/28 |
| 2016/0253509 A1* | 9/2016 | Wibran | G06F 21/6209 |
| | | | 726/1 |
| 2016/0373515 A1* | 12/2016 | Jagad | H04N 21/8586 |
| 2017/0251231 A1* | 8/2017 | Fullerton | H04N 21/4756 |
| 2018/0267862 A1* | 9/2018 | Aseev | G06F 16/113 |
| 2018/0278614 A1* | 9/2018 | Miller | G06F 21/604 |
| 2020/0067705 A1 | 2/2020 | Brown et al. | |
| 2020/0092300 A1* | 3/2020 | Mital | G06F 21/6254 |
| 2020/0145226 A1 | 5/2020 | Haddad et al. | |
| 2020/0226703 A1* | 7/2020 | Abad | H04L 67/55 |
| 2020/0242159 A1* | 7/2020 | Dain | G06F 16/906 |
| 2020/0266996 A1 | 8/2020 | Carrott et al. | |
| 2020/0274861 A1* | 8/2020 | Black | G06N 5/046 |
| 2021/0021423 A1* | 1/2021 | Latorre | G06Q 30/018 |
| 2021/0081923 A1* | 3/2021 | Rafferty | H04L 63/102 |
| 2021/0099453 A1* | 4/2021 | Cohen | G06Q 30/0201 |
| 2021/0350011 A1 | 11/2021 | Ashlock et al. | |
| 2021/0350033 A1* | 11/2021 | Kapinos | G06F 21/6245 |
| 2022/0210173 A1* | 6/2022 | Katmor | H04L 63/1416 |

OTHER PUBLICATIONS

"Configure behavior detection," Okta Help Center, dated obtained via Internet Archive as Apr. 20, 2021, URL: https://help.okta.com/en/prod/Content/Topics/Security/behavior-detection/configure-behavior-detection.htm.

Crowstrike, "Falcon Insight: Endpoint Detection and Response (EDR)", CrowdStrike Products, dated May 19, 2023.

Revankar, Mehul, "A Deep Dive into VMDR 2.0 with Qualys TruRisk", Last updated Mar. 1, 2023.

Non-Final Office Action dated Mar. 31, 2025 for U.S. Appl. No. 18/129,734.

* cited by examiner

600

Rulebase 501

| Logical Expression | IF TRUE | IF FALSE | Override |
|---|---|---|---|
| Label=='Sensitive'<br>AND<br>Device=='Remote' | Deny | Allow | — |
| Device=='Remote'<br>AND<br>Content.contains(PII) | Deny | Allow | — |
| Device=='Remote'<br>AND<br>Content.contains(PII)<br>AND<br>MFA=='Stale' | Challenge | — | — |
| Device=='Remote'<br>AND<br>History=='Suspicious' | Deny | — | — |
| User.role=='Admin' | Allow | — | Yes |
| Accumulated Trust<br>>=Threshold (Action) | Allow | Deny | — |
| ⋮ | ⋮ | ⋮ | ⋮ |

FIG. 6

ESTABLISHING USER DEVICE TRUST LEVELS

RELATED APPLICATIONS

The present application claims the benefit of priority to U.S. Provisional Patent Application Ser. No. 62/706,868 titled "DIGITAL SECURITY" filed on Sep. 14, 2020, which is hereby incorporated by reference in its entirety.

TECHNICAL FIELD

This disclosure relates to content management systems, and more particularly to techniques for establishing user device trust levels.

BACKGROUND

Computers and mobile smart devices (e.g., mobile smart phones, tablets, etc.) are ubiquitous. Whereas in earlier timeframes, most computing was performed using desktop or deskside computers, in modern times, a great deal of computing is done using mobile smart devices. Whereas desktop or deskside computers are relatively stationary, modern smart devices are highly mobile, sometimes small enough to fit into a pocket, and often configured for online access from any location and at any time. While device mobility adds a great deal of convenience that inures to the user, such mobility also introduces risk of mal-appropriation of the information going in and out of the device, as well as mal-appropriation of the device itself. As such, the device itself as well as the environment in which the device is being operated needs to be vetted so as to be trusted to a level appropriate for the information going in and out of the device.

Passwords and other forms of vetting a user or device only partially address the need to establish a trust level. Furthermore, even techniques such a multi-factor authentication only improve the likelihood that a user or device is fact the user or device that is being authenticated. Techniques such as deep packet inspection observe and report on network traffic and device mobility, but fail to assess the overall trustworthiness of the device with respect to specific operations that would or could be initiated by the device.

As such, legacy techniques are deficient in terms of establishing a device trust level with respect to the information going in and out of the device. What is needed are improved ways to establish user device trust levels.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for establishing user device trust levels, which techniques advance the relevant technologies to address technological issues with legacy approaches. More specifically, the present disclosure describes techniques used in systems, methods, and in computer program products for allowing or denying access to content management system data according to trust levels that are determined based on relationships between the device and the actual content of a content object to be accessed. Embodiments are directed to technological solutions that include content-based determinations when making deny/allow decisions.

Many of the herein-disclosed embodiments that include content-based determinations when making access deny/allow decisions are technological solutions pertaining to technological problems that arise in the hardware and software arts that underlie content management systems. Aspects of the present disclosure relate to improvements in peripheral technical fields as well, including, but not limited to, distributed storage systems and computerized authentication and authorization.

Some embodiments include a sequence of instructions that are stored on a non-transitory computer readable medium. Such a sequence of instructions, when stored in memory and executed by one or more processors, causes the one or more processors to perform a set of acts for using content-specific information when making access deny/allow decisions.

Some embodiments include the aforementioned sequence of instructions that are stored in a memory, which memory is interfaced to one or more processors such that the one or more processors can execute the sequence of instructions to cause the one or more processors to implement acts for using content-specific information when making access deny/allow decisions.

In various embodiments, any combinations of any of the above can be organized to perform any variation of acts for allowing or denying access to content management system data according to content-based device trust levels, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 6 depicts a rule codification technique as used in systems for allowing or denying access to content management system data according to content-based device trust levels, according to an embodiment.

DETAILED DESCRIPTION

Figure 1A:
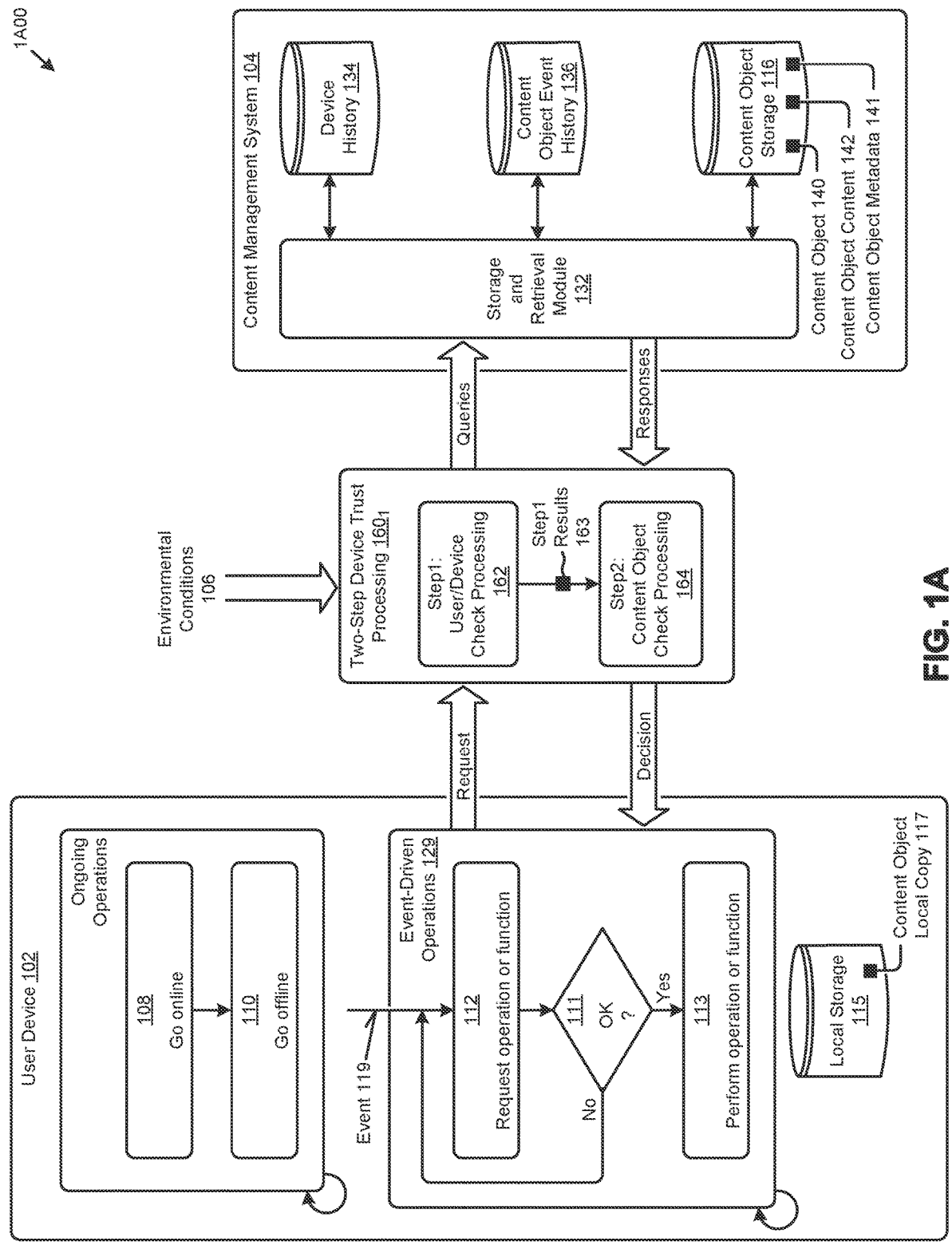
FIG. 1A exemplifies an environment in which systems for allowing or denying access to content management system data according to content-based device trust levels can be implemented.

Aspects of the present disclosure solve problems associated with using computer systems for making content-based deny/allow decisions. The accompanying figures and discussions herein present example environments, systems, methods, and computer program products for allowing or denying access to content management system data according to content-based device trust levels.

Overview

The determination to allow or deny access to information (e.g., access to a file or database or URL, etc.) can be based on the type of device and/or authentication of the device, and/or authentication of a user of the device, and/or based on environmental conditions under which the device is operating. Such determinations, in particular determinations to deny access can thwart mal-appropriation of information. Unfortunately, such determinations are very coarse, and fail to consider the nature of the specific information sought to be accessed. As a consequence of such coarse determinations, a device/user might be denied access to the sought-after information—even though the sought-after information had been made public. Further, and also as a consequence of such coarse determinations, a device/user might be permitted access to the sought-after information—even though the sought-after information is too sensitive to be delivered (for example) into an unsecured and/or unfriendly environment. Disclosed hereunder are device checks that consider aspects of the user, the device itself, and the device environment, in combination with aspects of the sought-after information.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A exemplifies an environment 1A00 in which systems for allowing or denying access to content management system data according to content-based device trust levels can be implemented. The figure is being presented to show how a plurality of user devices (e.g., user device 102) interacts with a content management system 104 in accordance with two-step device trust processing that controls whether to allow (or deny) performance of a particular operation or function of the content management system by a particular user device.

As shown, the user device 102 is continually performing ongoing operations such as going online (e.g., via occurrence 108) and then going offline (via occurrence 110), etc. There may be many reasons for making a transition from online to offline or from offline to online. During the transitions from online to offline and back, aspects of the environment (e.g., the shown environmental conditions 106) may change. The changes may occur prior to, or during, or after a transition. Aspects of the then-current environment are used to inform the two-step device trust processing $160_1$. Strictly as one example, the aspect of whether the user device is communicating in clear-text (e.g., over a public network) or whether the device is communicating within a virtual private network (VPN) can influence whether or not a particular access to particular sought-after information is to be allowed or denied. Aspects of the environment can be combined with aspects of sought-after information, and analysis of the combination can then be used to determine whether a particular operation or function over some particular content object is to be allowed or denied.

In the embodiment shown, the two-step device trust processing $160_1$ implements a fine-grained allow/deny device trust regime based on the combination of user/device check processing and content object check processing. More specifically, in response to a user request (e.g., event 119), user/device check processing 162 (e.g., step1, as shown) produces user/device check results (e.g., step1 results 163), which are then used by content object check processing 164 (e.g., step2, as shown) to reach a then-current decision to allow or deny, or to allow in part or deny in part the user request.

The aforementioned user request and/or additional user requests may be raised continually in a loop of event-driven operations 129. The event-driven operations may include raising a request to perform a CMS operation or function (e.g., step 112), performing a test (e.g., test 111) to confirm if (or when) the operation is permitted, and then performing a permitted operation or function (e.g., step 113) if and when permitted. The CMS operation or function may relate to a content object that is stored in the CMS system (e.g., content object 140), or the CMS operation or function may relate to a content object that is stored in local storage 115. More specifically, the CMS operation or function may relate to a shared copy of content object 140 that is stored in content object storage 116 of the CMS system, or the CMS operation or function may relate to a content object local copy 117 that is stored in a local storage area that is local to the user device.

Returning to the discussion of the two-step device trust processing, the user/device check processing 162 and/or the content object check processing 164 may be informed by responses returned by the CMS. Such responses may include aspects of device history 134, and/or aspects of content object metadata 141, and/or aspects of the actual content of a content object (e.g., content object content 142), and/or aspects of content object event history 136, etc.

As used herein, the content of a particular content object refers to the actual stored bits or actual stored bytes that comprise the particular content object. As such, content inspection of the contents of the file or other type of content object refers to consideration of the actual stored bits or actual stored bytes that comprise the file or other type of content object. In some cases, tags and/or other forms of metadata pertaining to a file or content object are stored as bits or bytes within the file or content object.

The content management system 104 may include a storage and retrieval module 132 that processes a query (as shown) so as to gather information from any of the aforementioned sources (e.g., based upon or derived from any one or more, or any combination of information in the device history, and/or aspects of content object metadata, and/or aspects of content object event history).

Forming any one or more specific, detailed queries involved in establishing user device trust levels may be facilitated by operational elements within the shown two-step device trust processing. Additionally, or alternatively, the detailed queries involved in establishing user device trust levels may be facilitated by operational elements of the user device. In some cases, operational elements within the shown two-step trust processing cooperate with operational elements of the user device, for example, to gather values pertaining to then-current environmental conditions.

Figure 1B:
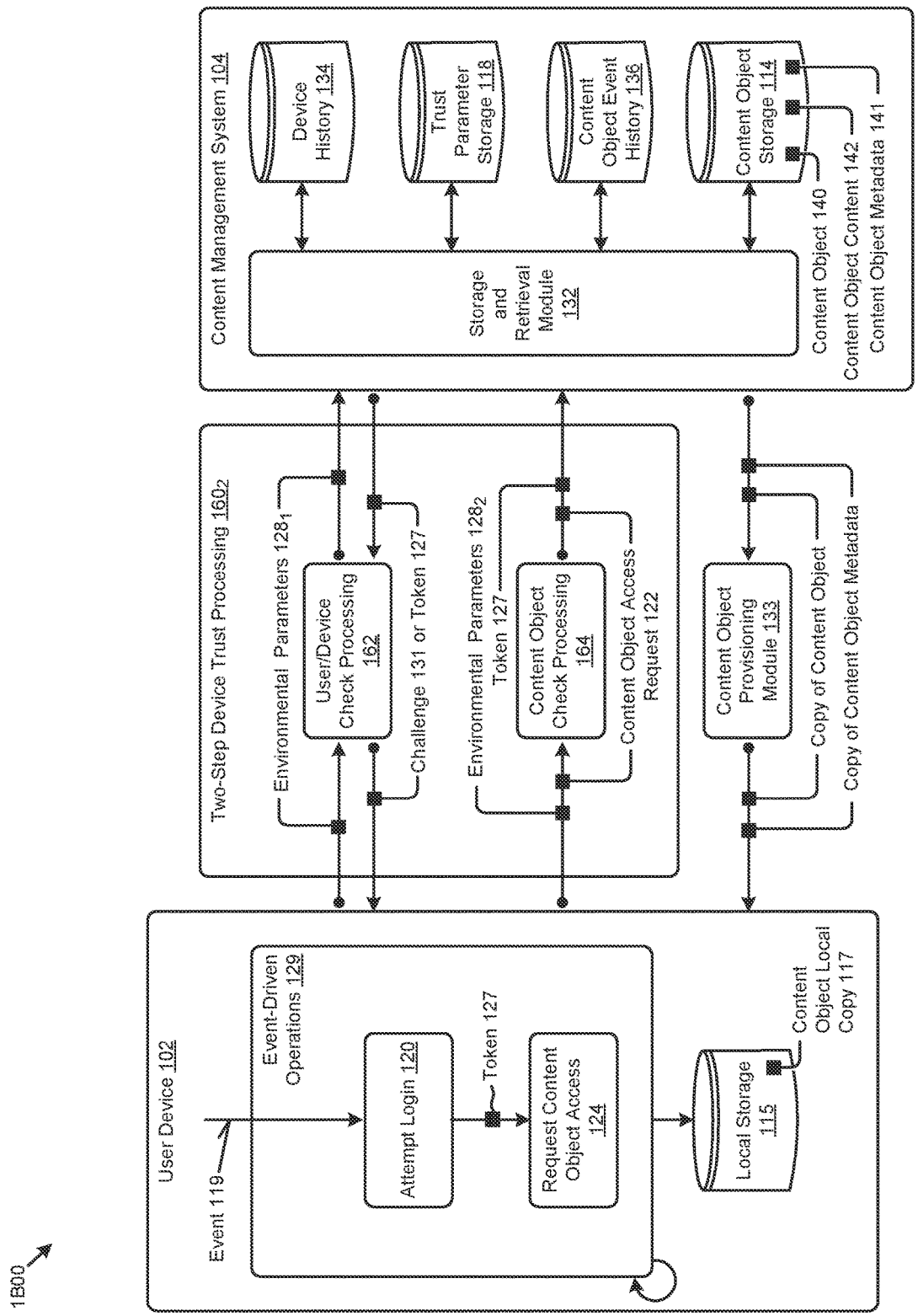
FIG. 1B shows an example configuration of a system for allowing or denying access to content management system data according to content-based device trust levels, according to an embodiment.

An example configuration of a system for allowing or denying access to content management system data, including various embodiments of user/device check processing 162 and content object check processing 164 are shown and described as pertains to FIG. 1B.

FIG. 1B shows an example configuration 1B00 of a system for allowing or denying access to content management system data according to content-based device trust levels. As an option, one or more variations of configuration 1B00 or any aspect thereof may be implemented in the context of the architecture and functionality of the embodiments described herein and/or in any environment.

The figure is being presented to illustrate how a range of environmental parameters and a range of trust parameters inform both the aforementioned user/device check processing 162 as well as content object check processing 164. Specifically, the figure is being presented to illustrate how a first set of environmental and trust parameters can be used to inform device check processing, whereas a second set of environmental and trust parameters are used to inform content object check processing.

In the embodiment shown in FIG. 1B, the user/device check processing is invoked by a login attempt 120. The login attempt may include steps for gathering environmental conditions. In some cases, operational elements of the user device respond to an event (e.g., event 119) and initiate a login attempt. In some cases, prior to invocation of a login attempt, various operational elements of the user device gather values of environmental parameters, which values pertain to then-current environmental conditions. Such values of environmental parameters may include details of the user device itself and/or details of the network to which the user device is connected. In some cases, various then-current values of environmental parameters are used to assess vulnerabilities that may be exposed as a consequence of the then-current environmental conditions.

For carrying out the first step of the shown two-step device trust processing $160_2$, values of environmental parameters are considered and/or packaged into a first set of environmental parameters $128_1$, which first set of environmental parameters are delivered to the CMS. The CMS in turn may store the first set of environmental parameters into trust parameter storage 118. As such, the first set of environmental parameters can be accessed by storage and retrieval module 132. The storage and retrieval module can, for example access trust parameter storage to retrieve the first set of environmental parameters that may be used in content object check processing and/or to any other subsequent device trust processing of any sort.

When the first set of environmental parameters are delivered to the CMS, the CMS might invoke storage and retrieval module 132 so as to access device history 134 and/or trust parameter storage 118. In some cases, the information contained in device history 134 and/or trust parameter storage 118 might implicate a particular content object. In such a case, content object history 136 and/or content object storage 114 might be accessed to identify information that might be used in determining a trust level for the device. Moreover, content object history 136 and/or content object storage 114 might be accessed to identify information that might be useful in determining whether to formulate a challenge or whether to send a token 127 to the device.

In some situations, the then-current trust level for the device is deemed to be relatively low, in which case, rather than sending a token, a challenge 131 is sent to the device and at least some portion of a login/challenge protocol is carried out by and between the user device and the CMS. At some point, possibly after one or more challenges, the CMS system will send a token 127, which token can be used when carrying out messaging to request content object access 124.

There may be some time between the moment a token is generated and the moment of requesting content object access. As such, when carrying out messaging to request content object access 124, a then-current second set of environmental parameters $128_2$ are gathered and sent for content object check processing 164. During the course of content object check processing, the particular content object sought to be accessed, together with a copy of the previously generated token 127, is provided to content object check processing 164. A particular content object access request 122 may refer to (1) a particular content object sought to be accessed (e.g., a file or folder), and/or a particular type of access (e.g., preview a file, edit a file, list contents of a folder, etc.). When the particular content object access request 122 is received by the CMS at storage and retrieval module 132 the storage and retrieval module may carry out a protocol with any one or more agents that implement content object check processing 164. Additionally, or alternatively, the storage and retrieval module of the CMS may perform and/or initiate performance of acts that facilitate making a determination as to whether to allow (or deny) a particular operation or function of the content management system (e.g., to allow a particular content object to be accessed for carrying out a particular type of access (e.g., preview a file, edit a file, list contents of a folder, etc.) and/or for performing a particular function of the content management system 104.

Any one or more of the shown content object check processing 164 and/or the shown storage and retrieval module 132 may consider the actual content of a sought-to-be-accessed content object. The determination as to whether to allow (or deny) a particular type of access (e.g., preview a file, edit a file, list contents of a folder, etc.) and/or for performing a particular function of the content management system can be made on the basis of aspects of the actual content of a sought-to-be-accessed content object. Strictly as an example, a determination to deny a READ access to a particular file might be made on the basis that the content of the particular file contains information that is deemed to be too sensitive to deliver to a device that is being operated over a network with known vulnerabilities. As another example, a determination to allow (or deny) a READ access to a particular file might be made on the basis that the content of the particular file contains (or does not contain) a watermark.

Continuing with the discussion of FIG. 1B, and in the case where access is allowed, then content object provisioning module 133 may provide a copy of the content object (or a copy of merely a portion of a content object), together with a copy of the content object metadata 141 (or a copy of merely a portion of a content object metadata) to the requesting user device. The user device may make a content object local copy to use while the device is offline. In some cases, an offline access token is provided to the device (e.g., for access to a particular copy of the content object or for access to a copy of merely a portion of a content object), and such an offline access token may have a validity period or expiration time and/or date.

The foregoing interactions between a user device and a content management system can be monitored on an ongoing basis. Moreover, a history of tracked interactions may be maintained such that aspects of interaction tracking can be (1) stored, and (2) used at any time to inform how to carry out the two-step device trust processing. More specifically, a history of tracked interactions may be combined with information pertaining to or derived from the actual content of a particular one or more content objects. One possible implementation of two-step device trust processing is shown and described as pertains to FIG. 2.

Figure 2:
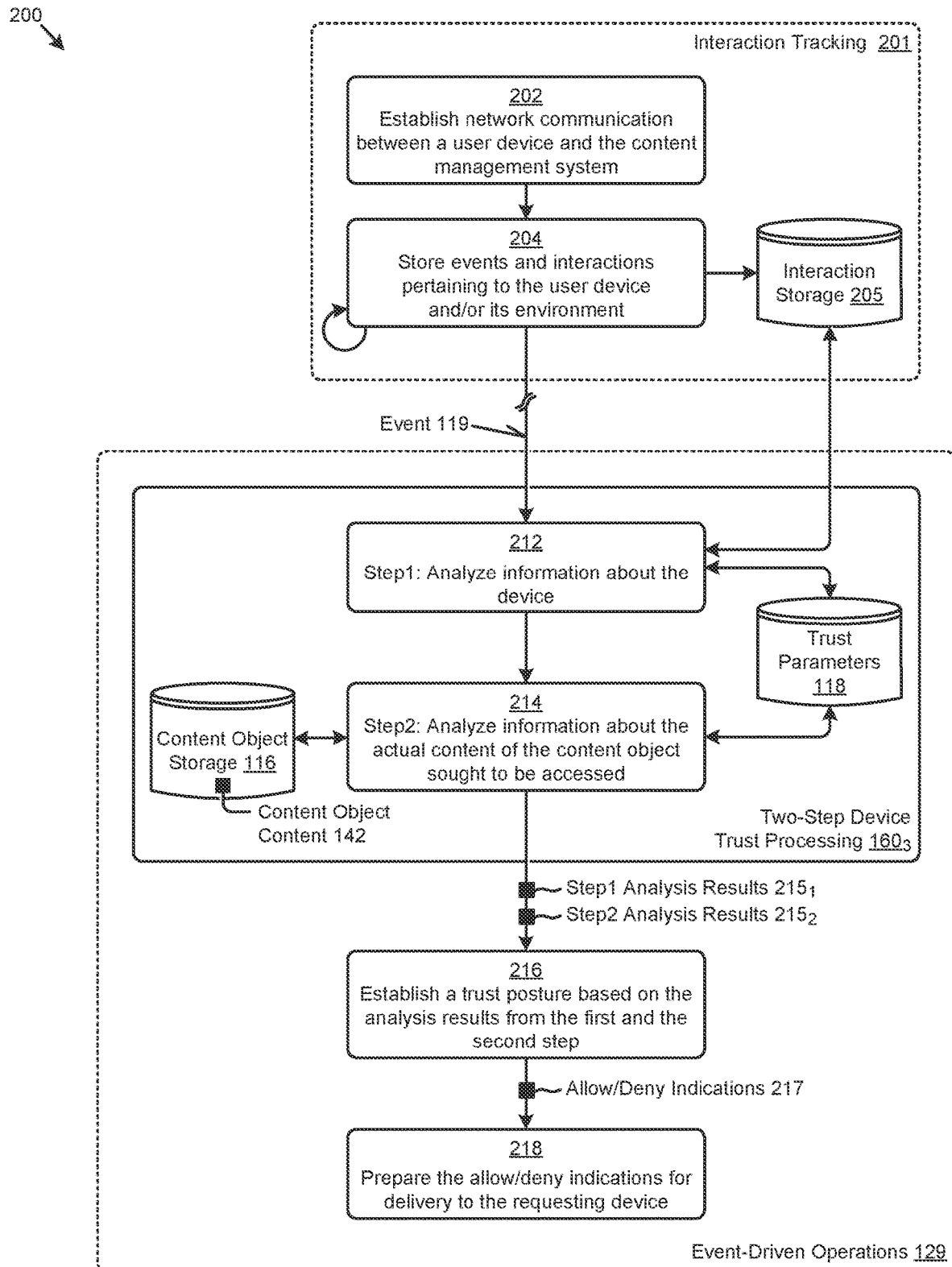
FIG. 2 is a flowchart of steps used in systems for allowing or denying access to content management system data according to content-based device trust levels, according to an embodiment.

FIG. 2 is a flowchart 200 of steps used in systems for allowing or denying access to content management system data according to content-based device trust levels. As an option, one or more variations of flowchart 200 or any aspect thereof may be implemented in the context of the architecture and functionality of the embodiments described herein and/or in any environment.

The figure is being presented to show how a flow can be carried out in an example environment. The shown flow includes ongoing activities of interaction tracking 201 that can be carried out concurrently with processing of event driven operations 129. The observation and storage of interactions between a user device and a content management system (e.g., step 204 of the shown ongoing interaction tracking 201) can be carried out asynchronously with processing of event driven operations 129. More specifically, responsive to establishing network communication between a user device and the CMS (step 202), any interactions pertaining to the user device and its environment, and/or interactions pertaining to the user device and the CMS, can be observed and recorded on an ongoing basis (step 204). Strictly as examples, interactions pertaining to the user device and its environment may include or pertain to (1) changes in networking security policies, and/or (2) changes in the software and/or hardware configuration of the user device (e.g., due to a software patch or replacement, etc.), and/or (3) changes in the authentication certificate used to securely authenticate a user or user device, and/or (4) other changes in the user device and its environment. Further, and again, strictly as examples, interactions (e.g., requests, accesses, uploads, downloads, etc.) between the user device and the CMS may include or pertain to (1) login attempts, and/or (2) content object access requests, and/or (3) content object editing or deletion, and/or (4) other interactions between the user device and the CMS.

Any or all observed interactions pertaining to the user device and its environment, and/or any or all interactions between the user device and the CMS can be stored (e.g., in interaction storage 205) for subsequent retrieval. In some implementations, interactions pertaining to the user device and its environment are classified as a change event, however in other implementations, interactions pertaining to the user device and its environment are classified fuzzy changes, that are considered at a later moment in time, possibly in conjunction with additional information. Strictly as one example, a fuzzy change might correspond to a change in a hardware or software configuration of a user device. As such, even though the device itself in toto had not changed, the configuration or "fingerprint" of the device had changed in a manner that would at least potentially be considered in determining device trust.

At any moment in time, an event 119 may be raised. As shown, such an event (e.g., an event raised by a user device) can be routed to one or more operational elements that comprise the two-step device processing. Responsive to the occurrence of the event, two-step device processing 160₃ can be invoked such that step1 of the two-step device processing (e.g., process 212) and step2 of the two-step device processing (e.g., process 214) are carried out (e.g., in a sequence, or in parallel, or partially in parallel and partially in a sequence). In the example shown, step1 of the two-step device processing (i.e., analyze information about the device) completes before initiation of step2 of the two-step device processing (i.e., analyze information about the content being requested). In this embodiment, step1 of the two-step device processing makes a certain set of trust determinations based on previously observed interactions (e.g., as stored in interaction storage 205). The results of making such trust determinations are captured as values that are associated with aspects of the device and its environment, which aspects of the device and its environment serve to inform trustworthiness of a particular device at a particular moment in time. Such values that are associated with aspects of the device and its environment are stored as trust parameters 118. Any entry in the trust parameters may be associated with a particular device as well as a time stamp of when the corresponding trust determination values were retrieved or calculated. Then-current values of trust parameters 118 are available to step2 of the two-step device processing. Step2 of the two-step device processing performs analysis based on then-current values of trust parameters that are considered in conjunction with gathered information pertaining to the actual content of a sought-after content object.

To illustrate the foregoing, consider a scenario where a device requests a download of a file "Hidden.xls". Further consider in this scenario that step1 determines that the requesting device is connecting through an IP address that is known to be associated with known malefactors (e.g., situated in a sovereign state that is known to be associated with password hack perpetration). Still further, consider that inspection of the contents of the file "Hidden.xls" might determine that the file contains sensitive information (e.g., passwords, password hashes, or other personally identifiable information). In this scenario, it is the combination of the IP address being associated with known malefactors together with the determination that the file contains sensitive information that leads to the requested download being denied. The foregoing is merely one scenario. A multitude of other scenarios abound where aspects of the actual contents of a sought-after content object is used in combination with aspects of the requesting device, which is then used in further analysis that leads to an "allow" or "deny" determination.

In the example embodiment of FIG. 2, the results of the two-step device trust processing are emitted as step1 analysis results $215_1$ and step2 analysis results $215_2$. These results are provided to downstream processing, the execution of which downstream processing results in an allow/deny determination. As shown, downstream processing includes establishment of a trust posture (process 216) based on the results of the two-step device trust processing. A trust posture may include a numeric value on a scale (e.g., a probability of a future occurrence), or a trust posture may include a plurality of allow/deny indications 217 that correspond to a respective plurality of possible operations that could prospectively be applied over a content object. In some cases, a trust posture may include a binary I/O or a binary allow/deny indication to apply to the then-current request.

Further downstream processing (e.g., step 218) determines whether or not, and how to respond to the requesting device. In some cases, a reply is suppressed such that no response is provided to the requesting device. In other cases, the foregoing allow/deny indications are prepared for delivery to the requesting device.

Now, returning to the discussion of event 119 that invokes event-driven operations 129, in addition to the scenario where event 119 is raised by a user device, there are cases where event 119 is raised by an occurrence in the CMS. In this situation, any/all portions of process 214 to analyze information about the actual content of a particular content object can be executed in advance of a request from a device so as to facilitate rapid generation of the step2 analysis results.

Strictly as examples, an occurrence that corresponds to event 119 can happen when a label applied to a content object changes (e.g., due to changes in the actual content of the content object or due to changes in the content object metadata of the content object). Additionally, or alternatively, an occurrence that corresponds to event 119 can happen when a content object is newly shared and/or when a collaboration group corresponding to the content object is modified (e.g., to include or exclude other collaborators, and/or to change the role or roles of any of the listed collaborators). Additionally, or alternatively, an occurrence that corresponds to event 119 can happen when a preview request is promoted to a download request, and/or when a content object is deemed to contain malware (e.g., ransomware or 'bots', etc.). In some cases, a document signing event (e.g., an e-sign event raised by a user operating a particular device) may raise an occurrence of event 119 that in turn initiates execution of all or portions of event-driven operations 129.

All or portions of the foregoing event-driven operations 129 can be implemented by means of communication protocols that are carried out between the content management system and a device that seeks to access content of the content management system. Example communication protocols are shown and discussed as pertains to FIG. 3A and FIG. 3B.

Figure 3A:
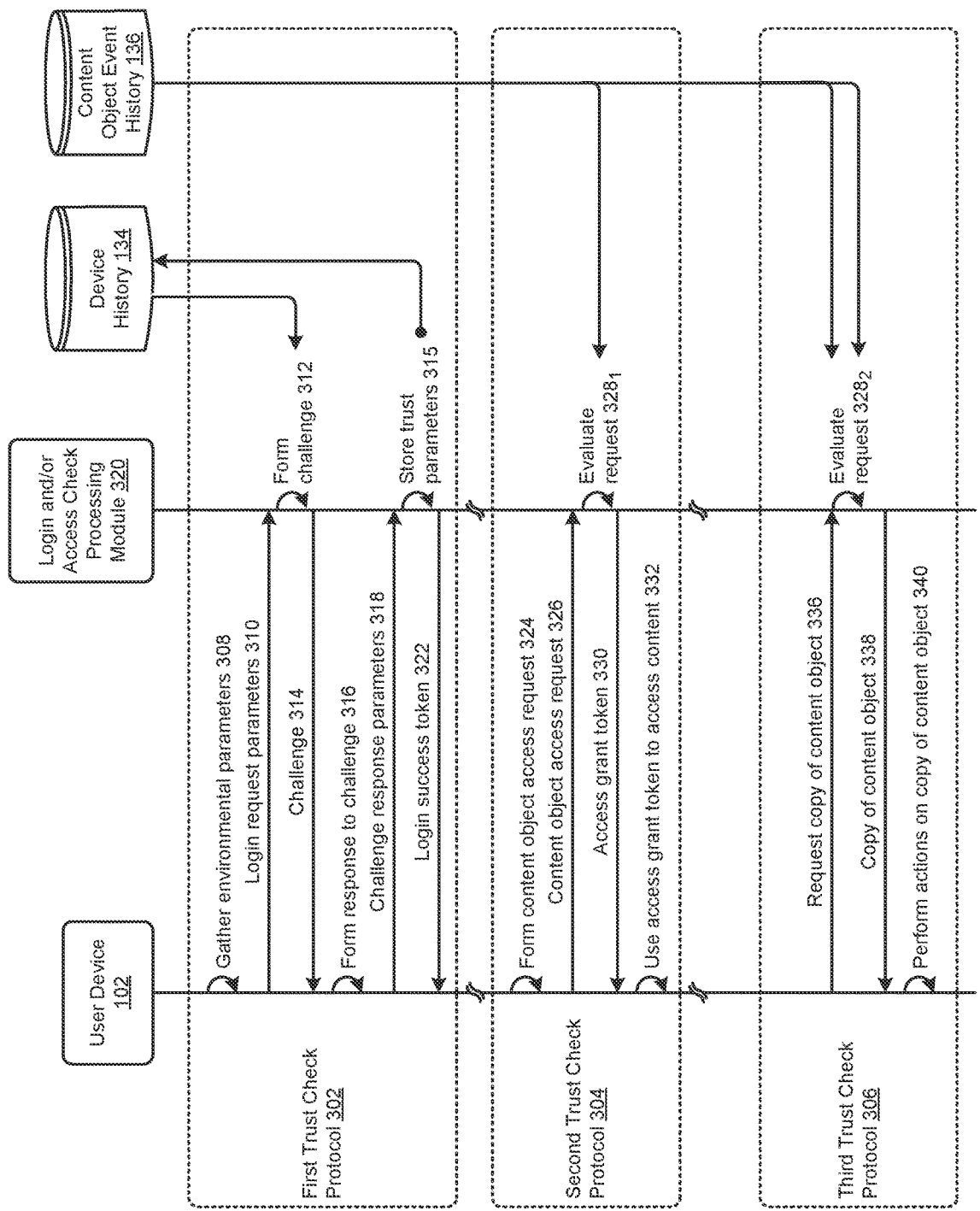
FIG. 3A and FIG. 3B depict example protocols as used in systems for allowing or denying access to content management system data according to content-based device trust levels, according to an embodiment.
Figure 3B:
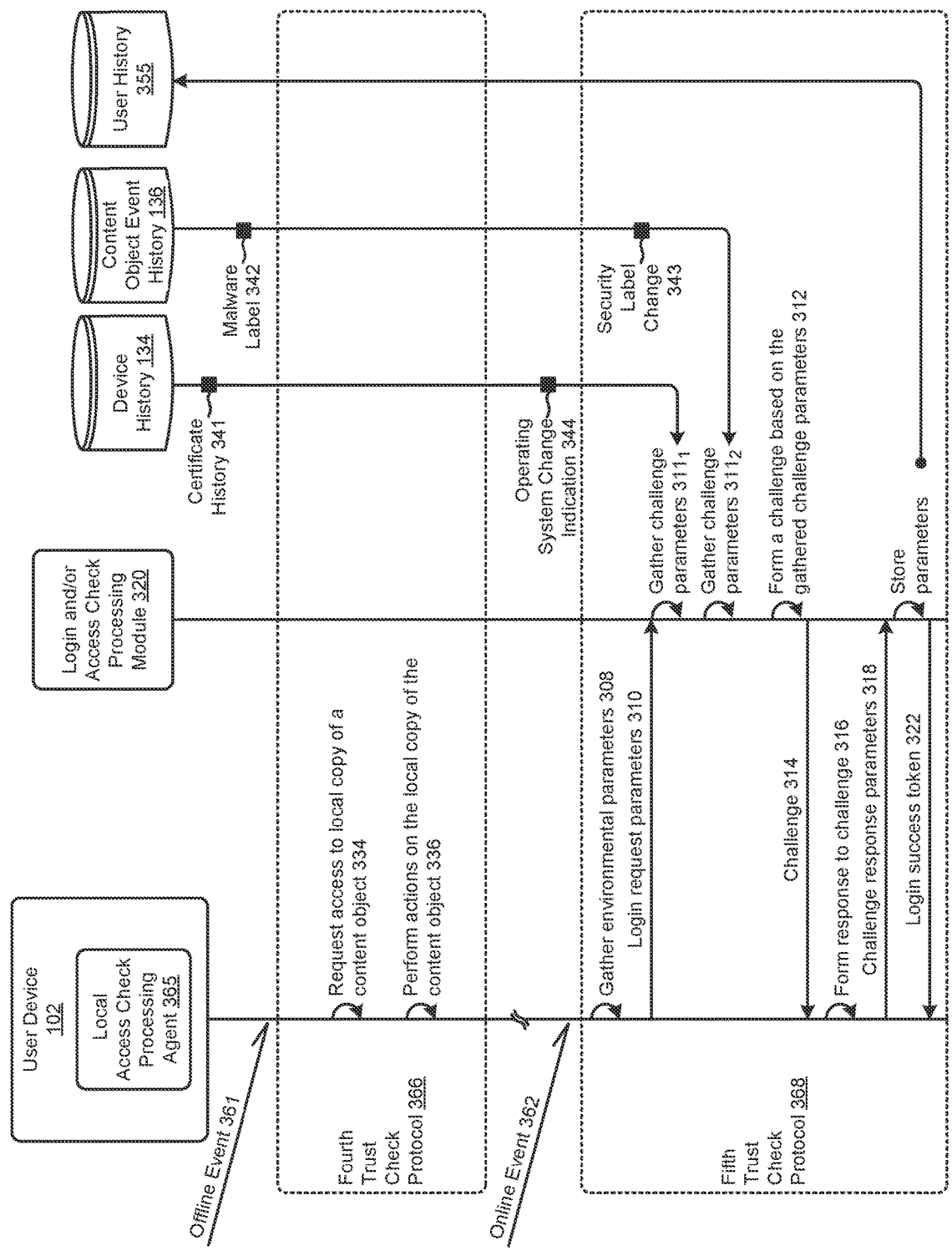

FIG. 3A and FIG. 3B depict example protocols as used in systems for allowing or denying access to content management system data according to content-based device trust levels. As an option, one or more variations of protocols or any aspect thereof may be implemented in the context of the architecture and functionality of the embodiments described herein and/or in any environment.

The several protocols of FIG. 3A and FIG. 3B are being presented to show specific steps that are taken by specific processing elements when carrying out the protocols. Specifically, FIG. 3A shows a first trust check protocol 302 to establish device trust based on a login attempt, a second trust check protocol 304 to provide one or more access tokens to a trusted device, and a third trust check protocol 306 to provide a copy token to a trusted device. The shown protocols are merely illustrative examples. Outcomes other than the shown outcomes are possible.

When carrying out the first trust check protocol, execution of an agent of user device 102 gathers information pertaining to the device itself and its environment (operation 308). A set of information pertaining to the device itself and its environment (e.g., login request parameters 310) is delivered to the CMS or its agent (e.g., to an operational element that performs the shown login and/or access check processing module 320). In turn, the CMS or its agent may provide a login success token or may form a challenge (operation 312) that is provided back to the device. In forming the challenge, a device history 134 may be accessed and the content of the device history is used to inform whether or not to form a challenge. For example, if a relatively long period of time has transpired between the current login request and the most previous login request, then a challenge, possibly including a multi-factor challenge, might be inserted into the protocol.

In the event that a CMS or its agent does provide a challenge (e.g., via message 314) to the device, the device can form a response to the challenge (operation 316). In some case, the device can provide a response to the challenge by sending a set of challenge response parameters (message 318) back to the CMS or its agent. In the event that the challenge is deemed to be met, then the CMS or its agent stores trust parameters (e.g., via operation 315) and responds to the device with a login success token (via message 322).

A login success token may have a limited duration during which the login success token is deemed to be valid.

As used herein, login information may include any aspect or characteristic of the foregoing login request parameters. Moreover, as used herein, login information may include any aspect pertaining to the user and/or the user device, and/or any aspect of the hardware or software configuration of the user device, and/or the network over which the user device is communicating with the content management system, and/or may subsume any other data items other than data that is either the actual stored content of a sought-after content object or data that is derived from inspection of the actual stored content of a sought-after content object.

Additional trust check protocols (e.g., for content object access and/or for content object downloading) can be carried out. Specifically, and as illustrated by second trust check protocol 304, the device may form a content object access request (operation 324) which is then delivered (e.g., via message 326) to the CMS or agent. The CMS or agent, in turn evaluates the content object access request (operation $328_1$) and if the request is allowed, then an access grant token is sent to the device (e.g., via message 330). The device in turn stores the access grant token for use in subsequent content object accesses (operation 332).

In some cases, the device seeks to request a copy of a sought-after content object. In this case, a still further, third trust check can be carried out. The device may request a copy of the sought-after content object (e.g., via message 336), and the CMS or agent will evaluate the content object copy download request (operation $328_2$). In this case, when the CMS or agent evaluates the content object copy download request, the CMS or agent accesses content object event history 136. The download request may be allowed or denied on the basis of a determined history. Specifically, and strictly as an example, the download request might be denied based on aspects of a recent series of download occurrences. On the other hand, if the download request is deemed to be allowed, then a copy of the requested content object is provided to the device (e.g., via message 338). The device can then perform actions on a downloaded device-local copy of the content object (operation 340).

In some scenarios, a user device is configured to permit a device access to a device-local copy of a content object even when the device is offline. Nevertheless device check processing can be carried out by an agent on the device. Such a scenario, including going offline and coming back online is shown and described as pertains to FIG. 3B. Specifically, FIG. 3B shows a fourth trust check protocol 366 that is carried out after a device goes offline (e.g., via offline event 361), and a fifth trust check protocol 368 that is carried out after a device goes back online (e.g., via online event 362). Specifically shown and discussed is the local access check processing agent 365 that serves to perform device trust operation on the device itself, when the device is offline. When the device is offline, the device can at least potentially access a local copy of a content object. Specifically, when the device is offline, the local access check processing agent can carry out several operations directly on the device—and without the need for online communication with the CMS.

In the example shown, a user who is operating the device may want to access a local copy of a content object. To do so, a request is made (operation 334) and, in the event that the content object sought to be accessed is stored locally at the device, then operations (e.g., READ, MODIFY, WRITE, etc.) can be performed on the local copy. Results of the foregoing operations (e.g., READ, MODIFY, WRITE, etc.) that are performed on the local copy can be stored locally.

At some moment in time, the device may go back online, raising an occurrence of an online event 362, at which time the shown fifth trust check protocol is initiated. It can happen that during the time that a device is offline, the device-local content object is vulnerable. For example, malware could at least potentially be inserted into the content object. Then, when the device goes back online, the CMS is susceptible to malware infection and/or at risk of propagating a malware infection. For example, any malware that had been inserted into the content object might be uploaded to the CMS, which malware in turn could be propagated to many users of the CMS.

To protect against occurrence of such an unwanted scenario, fifth trust check protocol 368 is carried out. As shown, the fifth trust check protocol begins when the device gathers environmental parameters (operation 308). Such environmental parameters are provided (via message 310) to the CMS. The CMS in turn carries out several gathering operations (e.g., gather challenge parameters $311_1$ and operation gather challenge parameters $311_2$). In a first gathering operation, device history 134 is accessed. Various historical events are considered. For example, the device history might show that an authentication certificate has a recent history (e.g., certificate history 341) of being tampered with or otherwise changed. Additionally, of alternatively, the device history might show that the device has a recent history of being updated with a new version of an operating system (e.g., as indicated by operating system change indication 344). Additionally, or alternatively, content object event history 136 can be accessed, which might reveal that a security designation (e.g., a security label) had changed during the time that the device was offline. In certain situations it can happen that content object event history 136 indicates that a particular content object had been detected as being malware and, as such, now has been labeled as malware (e.g., via malware label 342). In other situations it can happen that content object event history 136 indicates that a particular content object has a recently changed security label (e.g., as indicated via security label change 343). In such situations, login and/or access check processing module 320 can form a challenge based on the gathered challenge parameters (operation 312). When the CMS or its agent provides a challenge to the device (e.g., via message 314), the device forms a response to the challenge (operation 316) and then sends a set of challenge response parameters (message 318) back to the CMS or its agent. The CMS or agent can store the occurrence in user history 355. The user history can be accessed by the CMS when evaluating trust parameters to determine trust levels.

Figure 4:
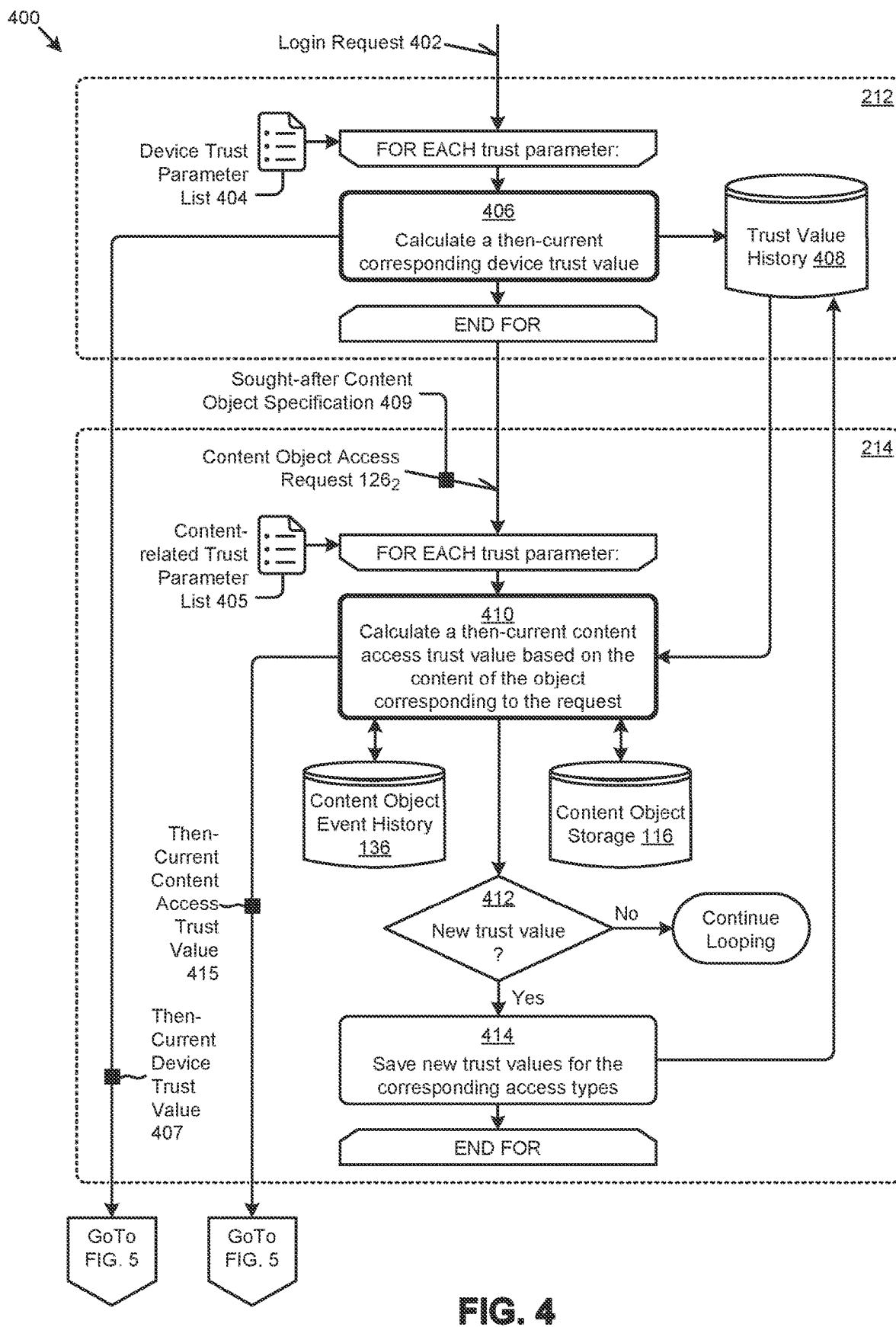
FIG. 4 depicts a two-step device trust processing technique as used in systems for allowing or denying access to content management system data according to content-based device trust levels, according to an embodiment.

One way to evaluate trust parameters to determine trust levels is shown and described as pertains to FIG. 4.

FIG. 4 depicts a two-step device trust processing technique 400 as used in systems for allowing or denying access to content management system data according to content-based device trust levels. As an option, one or more variations of the two-step device trust processing technique 400 or any aspect thereof may be implemented in the context of the architecture and functionality of the embodiments described herein and/or in any environment.

The figure is being presented to illustrate how calculation of then-current device trust values are used to inform calculation of content access trust values. Further, the figure is being presented to illustrate how such trust calculations that had been made at a first time can be saved in a history repository, and then used when making subsequent trust calculations.

The shown device trust processing technique 400 commences when a login request 402 is received from a user device. Specifically, process 212 is invoked to calculate a plurality of then-current device trust values corresponding to a plurality of device trust parameters. The plurality of then-current device trust values can be calculated by entering a FOR EACH loop that iterates over a plurality of device trust parameters. In this implementation, the iterations are informed by a device trust parameter list 404. Each item of the device trust parameter list has a corresponding method for calculating a then-current device trust value that corresponds to the device trust parameter of a particular iteration (step 406). Any calculated then-current device trust value that corresponds to the device trust parameter of a particular iteration can be stored in a durable repository (e.g., trust value history 408. The trust value history may be used by later-invoked processes.

In the example of FIG. 4, process 212 is invoked upon a login request 402, however process 212 may be invoked at any moment in time. In some cases, process 212 is commenced when any sort of change in the device and/or its environment is detected. Moreover, in some cases, process 212 is commenced independent of occurrence of a login request. Strictly as one example, process 212 might be commenced when a software module (e.g., application component or operating system component) is downloaded into the device. In this situation, process 212 might be commenced upon download or installation of such a software module to the device. Commencement of process 212 might occur in other situations and/or under other environmental and/or temporal conditions such as even after the device had logged out and before a subsequent login request has been made.

The device trust parameter list 404 may be composed of any one or more sets of parameters that can have an associated then-current value. Strictly as examples, a device trust parameter may correspond to a value (e.g., TRUE or FALSE) of whether or not the device has a configured copy of a virus checker, and/or a device trust parameter may correspond to a value (e.g., TRUE or FALSE) of whether or not the device has a configured copy of a virus checker, and/or a device trust parameter may correspond to a manufacturer's name or model identification and/or a value that corresponds to whether or not the device has up-to-date security patches, etc. The foregoing are merely examples, and other device trust parameter values can be used to calculate content-related trust values, which in turn can be used to make allow/deny determinations.

The operations of process 214 illustrate one implementation of how device trust parameter values can be used to calculate content-access trust values. Specifically, and as shown, a FOR EACH loop iterates over each entry in a content-related trust parameter list 405. The loop can be entered in response to an incoming content object access request 126₂. The content object access request may include a sought-after content object specification 409. For example, the sought-after content object specification may refer to a folder or a file of the CMS. Alternatively or additionally, the sought-after content object specification may refer to a folder or a file that is in any local storage area that is local to the user device (e.g., as a result of a download from the CMS).

The actual content of the content object referred-to by the content object specification can be accessed by the CMS or its agent prior to granting (or denying) access to the user device to access the content object referred to by the content object specification. More specifically, the actual content of the content object referred to by the content object specification might be accessed in response to receipt of an incoming content object access request. Additionally, or alternatively, the actual content of the content object referred to by the content object specification might have been pre-processed (e.g., prior to receipt of the incoming content object access request), for example when the CMS or its agents consider the actual content of the content object for purposes of labeling (e.g., security and/or privacy labeling) and/or when the CMS or its agents consider the actual content of the content object for purposes of classification (e.g., for the content to be classified and/or labeled as containing malware) or for the purpose of identifying and/or quantifying the presence of personally identifiable information (PII) in the actual content of the content object.

This is shown in FIG. 4 at step 410 where, in each iteration, step 410 calculates a then-current content access trust value 415 based on the content of the content object corresponding to the request. Such calculations often require accesses to the content of the content object storage 116 and/or to the content object event history 136. For example, consider a case where one of the content-related trust parameters of the content-related trust parameter list 405 specifies calculation of a then-current count of the number of occurrences of PII in the content object referred to by the content object specification. In that case, the content of the content object referred to by the content object specification is accessed and the count of occurrences of PII in that content object is assigned to a then-current content access trust value. As another example, consider a case where one of the content-related trust parameters of the content-related trust parameter list specifies determination of recent accesses by devices to the content object referred to by the content object specification. In this case, the content object event history 136 of the content object referred to by the content object specification is accessed and a characterization of the number of recent accesses by other devices is assigned to a then-current content access trust value for that iteration.

In some cases, a then-current content access trust value for a particular iteration breaches a new value threshold (decision 412). If a particular threshold is breached (e.g., corresponding to the "Yes" branch of decision 412), then further processing is carried out so as to determine what access types (e.g., READ, MODIFY, WRITE, etc.) might be affected by the specific threshold breach. The calculated then-current content access trust value for the particular iteration is then stored (step 414) in trust value history 408. As such, a trust value history for the device, possibly including an allow/deny history for the device, can be maintained in this manner to permit the trust value history to be accessed in downstream processing. In some situations it can happen that a then-current content access trust value or combination of then-current content access trust values may cause a particular type of challenge to be formed. For example, if there were many recent accesses to a folder by many different devices (i.e., an event history indicative of a 'bot'), then a new, possibly multi-factor challenge might be issued prior to making the determination to allow or deny the requesting device to access the content object referred to by the content object specification.

The determination to allow or deny the device to access the content object referred to by the content object specification can be made on the basis of a combination of a then-current device trust value 407 and a then-current content access trust value 415. Combinations can be codified as rules, which rules can include logical expressions that, when evaluated, inform decision-making as to whether or not, and/or under what circumstances, the device can access the requested content object. One possible rule evaluation technique is shown and discussed as pertains to FIG. 5.

Figure 5:
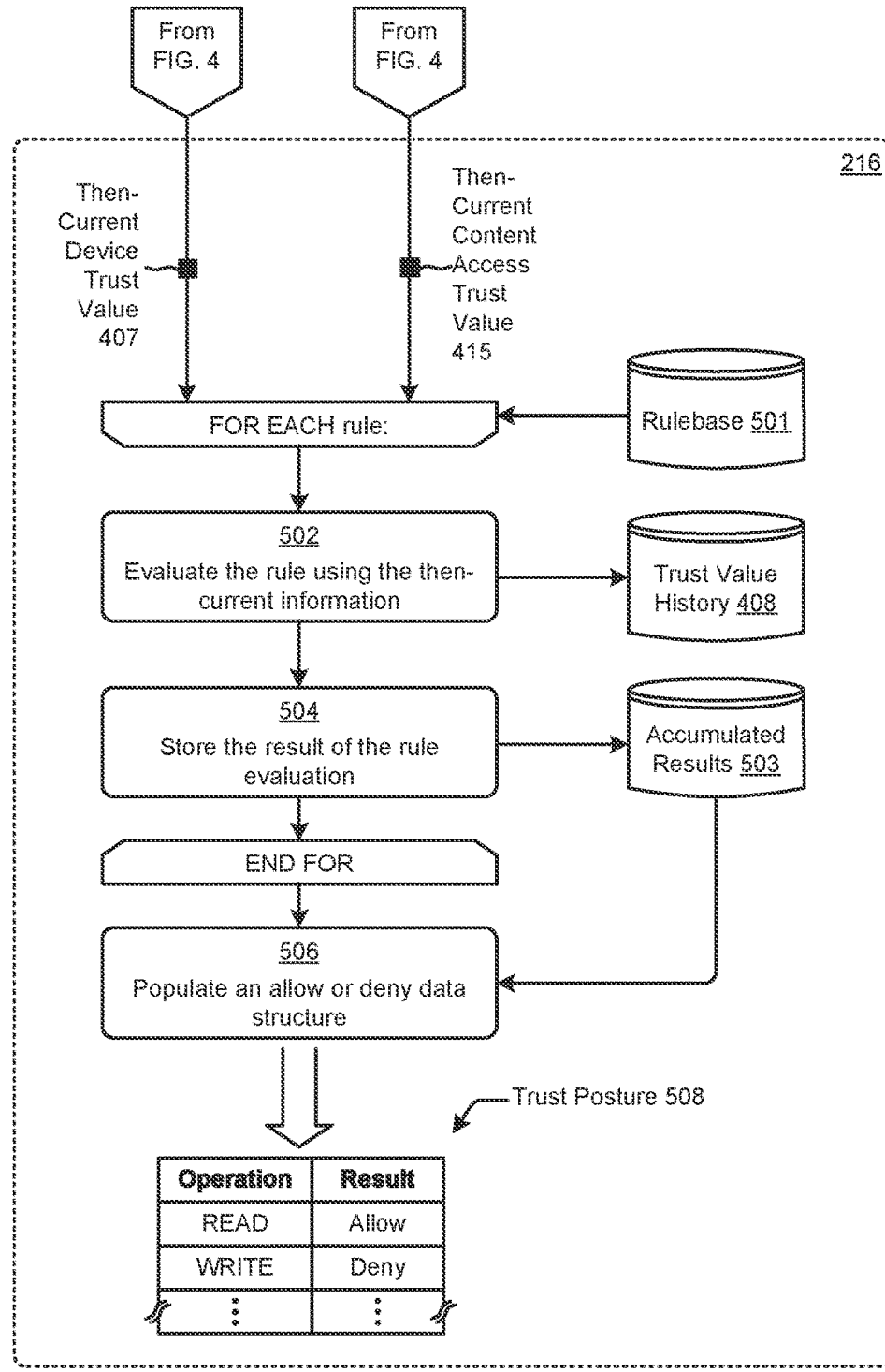
FIG. 5 depicts a device trust rule evaluation technique as used in systems for allowing or denying access to content management system data according to content-based device trust levels, according to an embodiment.

FIG. 5 depicts a device trust rule evaluation technique 500 as used in systems for allowing or denying access to content management system data according to content-based device trust levels. As an option, one or more variations of device trust rule evaluation technique 500 or any aspect thereof may be implemented in the context of the architecture and functionality of the embodiments described herein and/or in any environment.

The figure is being presented to illustrate one implementation (e.g., the steps of process 216) of a technique to establish a trust posture based on the results (e.g., a then-current device trust value 407 and a then-current content access trust value 415) of the two-step device trust processing. A trust posture 508 may include a numeric value on a scale (e.g., a probability of a future occurrence), or a trust posture may include a plurality of allow/deny indications that correspond to a respective plurality of possible operations that could prospectively be applied over a content object. In some cases, a trust posture may include a binary I/O or a binary allow/deny indication to apply to the then-current request.

In this specific embodiment, the trust posture is codified as a plurality of allow/deny indications that correspond to a respective plurality of possible operations that could be applied over a particular content object. The steps of process 216 commence upon receipt of a then-current device trust value 407 and a then-current content access trust value 415, such as had been calculated in process 212 and process 214 of FIG. 4. Specifically, upon receipt of a then-current device trust value 407 and a then-current content access trust value 415, a FOR EACH loop is entered such that the shown processing is performed iteratively over a plurality of rules drawn from a rulebase 501. More specifically, in each iteration, a rule is evaluated (step 502) using then-current information. The then-current information used in the rule evaluation may comprise then-current device trust values, then-current content access trust values, and values drawn from a trust value history 408.

The result or results of the rule evaluations are stored (step 504) as accumulated results 503, which accumulated results are accessed again after the last rule evaluation iteration. Strictly as one example, step 506 populates entries in an allow/deny data structure where each entry associates an allow or deny indication with a particular operation (e.g., READ, MODIFY, WRITE, etc.).

In this and other embodiments, accumulated results 503 stores rule evaluation results for each rule. In some cases, a rule is specific to a particular operation or function. For example, a first rule might be specific to a READ operation, whereas a different second rule might be specific to a WRITE operation. To illustrate, a first rule might handle the situation, "RULE1: If the device does not have virus checking enabled, then deny WRITE operations", whereas a different or second rule might handle the situation "RULE2: If the device does not have virus checking enabled, then allow only READ operations". As such, operation-specific entries can be made where each entry associates an allow or deny indication with a particular operation. Continuing discussion of the foregoing situations, if the requested operation was to "Edit" (e.g., demanding both READ and WRITE grants), and the device "does not have virus checking enabled" then the trust posture might include an entry to allow functions that involve a READ operation, but deny functions that involve a WRITE operation.

There are many techniques for codifying rules. In some cases, a rule is implemented as a method or subroutine. In other implementations, a rule is implemented as a logical expression that can be evaluated using a combination of then-current values. In some cases, a logical expression includes a return value of a call to a method or subroutine that is executed using then-current values. One possible rule codification technique involving the foregoing techniques is shown and described as pertains to FIG. 6.

FIG. 6 depicts a rule codification technique as used in systems for allowing or denying access to content management system data according to content-based device trust levels. As an option, one or more variations of rule codification technique 600 or any aspect thereof may be implemented in the context of the architecture and functionality of the embodiments described herein and/or in any environment.

As shown, rulebase 501 is a table of entries where each row of the table has a logical expression, an entry corresponding to "If TRUE", an entry corresponding to "IF FALSE", and an "Override" indication. The entry corresponding to "If TRUE", as well as the action corresponding to "IF FALSE" can be an explicit allow or deny indication, or an action to take (or a series of actions to take) "If TRUE", as well as an action to take (or a series of actions to take) "IF FALSE". In some cases an entry corresponding to "If TRUE" or "If FALSE" can be a "don't care" indication such that a different rule might inform a particular action to take.

To illustrate, and strictly as an example, if the logical expression codifies the semantics of the sought-after information is sensitive (e.g., determined by "Label=='Sensitive'") at the same time that the device is determined to be at a remote location (e.g., determined by "Device=='Remote'"), and if both of those expressions are true, then the action to be taken is to deny the requested access. Otherwise, the action to be taken is to allow the requested access.

In some cases, a particular rule can have actions to take other than allow or deny. For example, and as shown, if the device is deemed to be remote (e.g., as determined by evaluation of the expression "Device=='Remote'") and if the sought-after information contains personally identifiable information (e.g., as determined by evaluation of the expression "Content.contains (PII)" and if a multi-factor authentication challenge is either stale or has not been successfully accomplished, (e.g., as determined by evaluation of the expression "MFA=='Stale'"), then the action to take is to raise a challenge to the requesting device.

In some cases, a particular rule can be defined to override other rules. For example, if the user that is associated with the requesting device has a role as an administrator (e.g., as determined by evaluation of the expression "User.role=='Admin'"), then the request will be allowed as an override to other rules that may have evaluated to a denial of the request.

The foregoing are merely illustrative examples. Many additional specific rules can be codified to be able to address a multitude of other situations. Strictly as non-limiting examples, a rule can include an expression that gauges the quantity (e.g., relative to a threshold) of PII as a TRUE/FALSE determinant; and/or a rule can include an expression that gauges the continuity of a particular device over time such that devices that have a longevity or pattern of trust are deemed to be more trustworthy than devices that do not have a longevity or pattern of trust; and/or a rule can include an expression that results in different actions to be taken based on whether the user associated with the device is a "creator" of the sought-after content object, and/or whether the user associated with the device is an "owner" of the sought-after content object, and/or whether the user associated with the device is a "contributor" of the sought-after content object.

In some embodiments, an IP address associated with a user device and/or its environment may resolve to a particular geography that can be mapped to a political boundary. In some embodiments, the IP address can be used to identify the country from within which a request has originated. Thus it is possible to deny access if the request originates from a specific country (e.g., a country on a "watch list" or "threat list", etc.). Further, one or more IP addresses (e.g., hops along a routing path) can be used to identify suspicious activities, such as might arise from "Impossible Travel" where a user/device is showing (e.g., in a history file) as having been logged in from the United States at 7 am, and again from China at 9 am. Since it is impossible for this to happen, this user/device might be marked as being associated with a suspicious access pattern. Such a suspicious access pattern might cause the user/device and/or its associated IP addresses to be added as entries into a block list so as to block access to content objects. Similarly, under different conditions, and/or for different purposes, a user might be placed on an allow list, whereby only users who are on the allow list can access content.

Further details regarding general approaches to identifying suspicious access patterns are described in U.S. application Ser. No. 16/553,106 titled "AVOIDING USER SESSION MISCLASSIFICATION USING CONFIGURATION AND ACTIVITY FINGERPRINTS" filed on Aug. 27, 2019, which is hereby incorporated by reference in its entirety.

In some embodiments, the role of a particular device owner can be used in a rule. For example, if the device owner is marked as being assigned to a person having a role of an executive or if the device owner is marked as being assigned to a person having a role or function (e.g., administrator, specialist, etc.) of one who would typically access sensitive information, then more stringent rules and/or more frequent device checks might be performed and/or challenges might be raised more frequently. This is to mitigate risk if/when a device is mal-appropriated by a malefactor.

In some settings, changes in permissions and/or changes in roles, and/or changes in sharing boundaries (e.g., a sharing boundary based on the pattern of sharing/collaboration for a user and other users in the user's enterprise) are all indicative of increased vulnerability. As such, changes in permissions and/or changes in roles, and/or changes in sharing boundaries can be used in rules, and/or can be used to inform how rules are applied. For example, if a sharing boundary is expanded to include many additional collaborators, this sharing boundary expansion might be deemed to be a vulnerability, and as such, more stringent rules and/or more frequent checks might be performed and/or challenges might be raised more frequently.

Further details regarding general approaches to identifying changes in sharing boundaries are described in U.S. application Ser. No. 16/553,073 titled "DYNAMICALLY GENERATING SHARING BOUNDARIES" filed on Aug. 27, 2019, which is hereby incorporated by reference in its entirety.

Events that lead to, or are otherwise related to the foregoing permissions changes and/or changes in roles, and/or changes in sharing boundaries can be codified into rules of the rulebase. In some cases, determining events that lead to or are otherwise related to the foregoing changes can use machine learning models that learn to classify usual or expected patterns differently from anomalous, suspect, or suspicious patterns. As such, machine learning models can be employed to identify potential anomalous behaviors. Moreover, a rule can be codified to be informed by outputs of such learning models. In some cases, a rule can incorporate a method or subroutine to collect signals that are used as inputs to a learning model, and the action to take upon evaluating the rule can be based on the outputs of the learning model.

Additionally or alternatively, machine learning models can be employed to learn the sensitivity level or other characteristics of content that a user usually interacts with, and thus such machine learning models can be employed to identify if/when a particular user/device is accessing content that is more sensitive or otherwise characteristically different than had been accessed in prior timeframes. A rule can incorporate a method or subroutine to collect signals that are used as inputs to such a machine learning model, and the action to take when evaluating the rule can be based on the changes as reported by the machine learning model.

Security-oriented rules and corresponding machine learning models can be configured to consider a range of security policies. Specifically, various security policies might be applicable to certain types of content objects. Strictly as one example, a policy might cover the semantics of "prevent download if a file has a classification label of 'CONFIDENTIAL'". As another example, a policy might cover the semantics of "prevent download if a file has content that is deemed to be 'PII'". Based on training over a corpus of documents that have been labeled with particular classification labels (e.g., "CONFIDENTIAL", "PII", etc.) a machine learning model can learn which content objects have content that is similar to the content as was used in the training corpus. As such, rules that incorporate use of such machine learning models serve to improve security by applying security policies to content objects that have been automatically determined to be similar in content to the content of content objects that have been considered in the training of the machine learning models.

Rules can be codified to consider the existence of and/or expiration of access tokens. Such access tokens might have been provided to a device (e.g., during an exchange such as in the heretofore discussed protocols). Furthermore the same or different rules can be codified to consider the existence of, validity of, and/or expiration of, offline access tokens.

Still further, security-related rules can be codified and applied to a content object request. Again, strictly as an example, if it is detected that a device is vulnerable (e.g., communicating over an unsecured network) the action of a rule can cause automatic watermarking of any content that is accessed on that device. As another example, if a requested content object is deemed to be subject to a legal hold then, rather than satisfying the request, an administrative alert can be raised. Additionally or alternatively, the user of the requesting device can be subjected to a challenge before the CMS attempts to satisfy the content object access request.

Even still further security-related rules can be codified and applied to a content object request. Again, strictly as an example, if it is detected that multiple content object access requests have been received from multiple different devices of the same user, then a rule that is configured to detect such a condition can cause a check to be made to confirm that the number of devices involved is below a threshold number of permittable devices. Such a threshold can be implemented using any known technique, one of which involves administration of a "device pinning" limit that serves to configure a threshold of how many devices are permitted for use by a particular user. Such a "device pinning" threshold can be used to prevent access from personal devices. Also, such a "device pinning" threshold can be used to prevent access from a large number of devices that might be infected with 'bot' malware. A device that is deemed to be an additional device that breaches a "device pinning" threshold might be subjected to a challenge. Moreover, such a challenge might be formed specifically with respect to any know aspects of the device and/or its environment.

There are many techniques for forming challenges and there are many outcomes that can be based on whether or not, or how a challenge is satisfied. Moreover, satisfaction of a challenge can be tied to particular outcomes or functions. Strictly as examples, a device can be challenged to provide a user/device identification code (e.g., a PIN). Such user/device identification code can be of any complexity. As examples, a user/device identification code can be tied to the functioning (e.g., block or allow) camera access, and/or a user/device identification code can be tied to device-specific encryption requirements, and/or to control access to (e.g., block or allow) and/or to control the behavior of a specific application. In some such cases, CMS-controlled (e.g., PIN-controlled) behavior of an application might include invocation of an agent to purposely delete data stored by the application. In some cases, the CMS-controlled behavior of an application or multiple applications might include requiring that a specific version of the application or applications be downloaded to the device before next actions. In some cases, signals that arise from the any one or more of the foregoing applications can be used to assess a device trust level and/or to enforce a device trust regime.

Additional Embodiments of the Disclosure

Instruction Code Examples

Figure 7A:
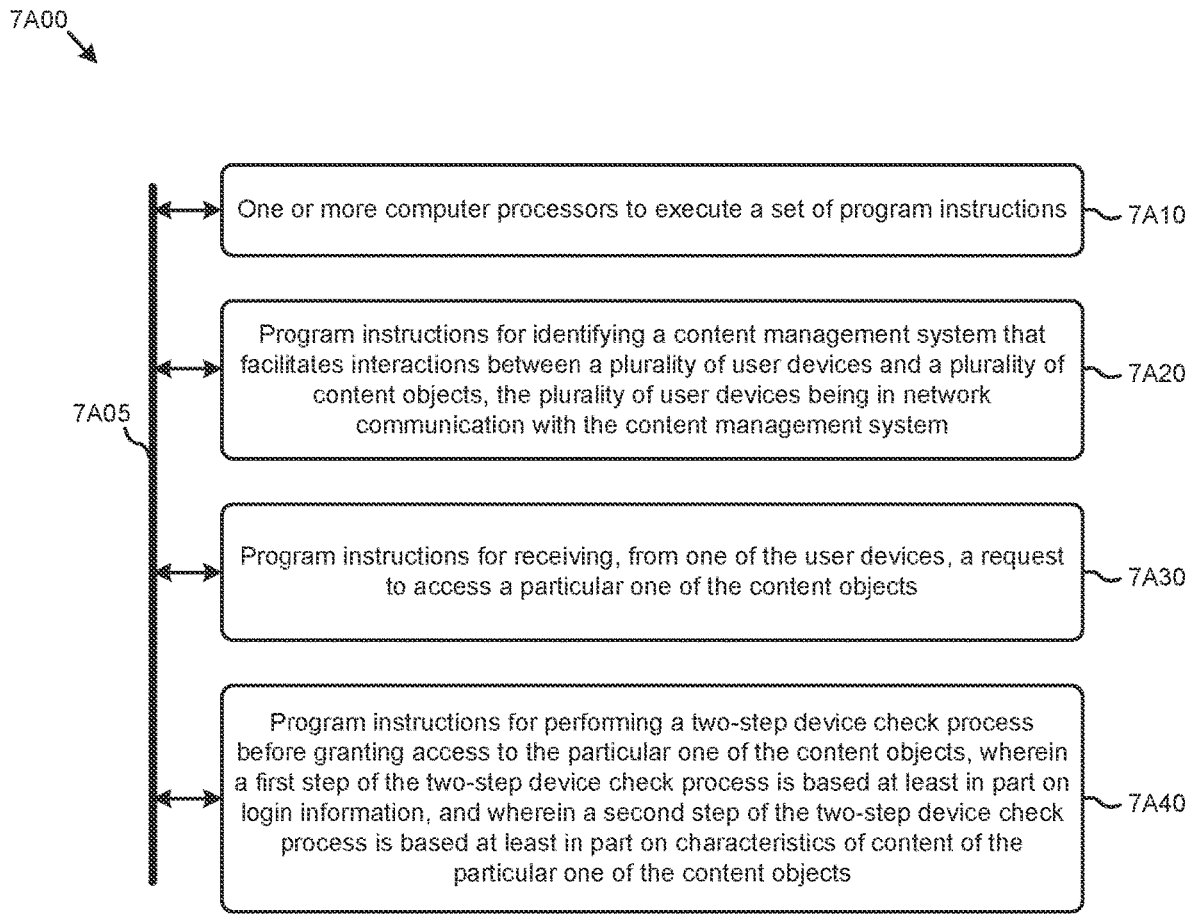
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. This and other embodiments present particular arrangements of elements that, individually or as combined, serve to form improved technological processes that address making content-based deny/allow decisions. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment. The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with any other operations over communication path 7A05. The modules of the system can, individually or in combination, perform method operations within system 7A00. Any operations performed within system 7A00 may be performed in any order unless as may be specified in the claims. The shown embodiment implements a portion of a computer system, presented as system 7A00, comprising one or more computer processors to execute a set of program code instructions (module 7A10) and modules for accessing memory to hold program code instructions to perform: identifying a content management system that facilitates interactions between a plurality of user devices and a plurality of content objects, the plurality of user devices being in network communication with the content management system (module 7A20); receiving, from one of the user devices, a request to access a particular one of the content objects (module 7A30); and performing a two-step device check process before granting access to the particular one of the content objects, wherein a first step of the two-step device check process is based at least in part on login information, and wherein a second step of the two-step device check process is based at least in part on characteristics of content of the particular one of the content objects (module 7A40).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 7B:
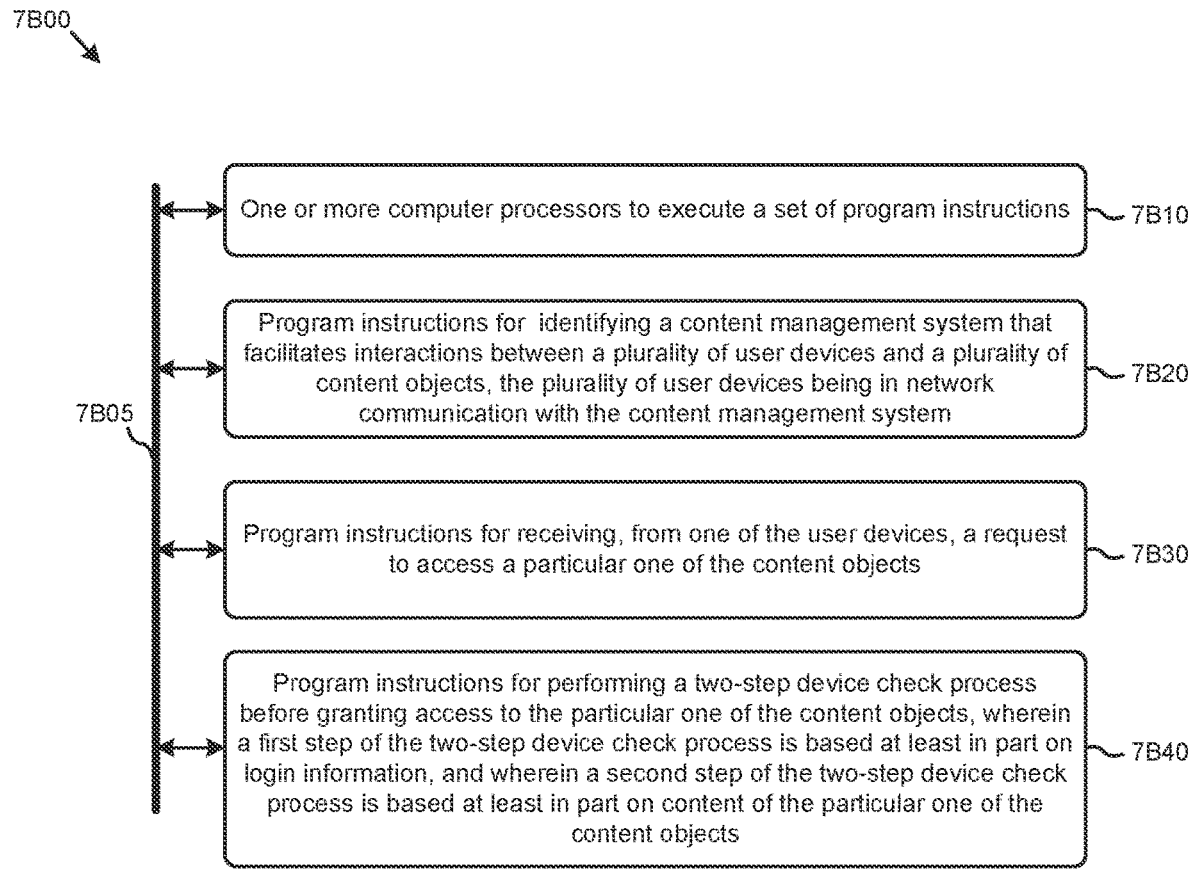

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. As an option, the system 7B00 may be implemented in the context of the architecture and functionality of the embodiments described herein. Of course, however, the system 7B00 or any operation therein may be carried out in any desired environment. The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with any other operations over communication path 7B05. The modules of the system can, individually or in combination, perform method operations within system 7B00. Any operations performed within system 7B00 may be performed in any order unless as may be specified in the claims. The shown embodiment implements a portion of a computer system, presented as system 7B00, comprising one or more computer processors to execute a set of program code instructions (module 7B10) and modules for accessing memory to hold program code instructions to perform: identifying a content management system that facilitates interactions between a plurality of user devices and a plurality of content objects, the plurality of user devices being in network communication with the content management system (module 7B20); receiving, from one of the user devices, a request to access a particular one of the content objects (module 7B30); and performing a two-step device check process before granting access to the particular one of the content objects, wherein a first step of the two-step device check process is based at least in part on login information, and wherein a second step of the two-step device check process is based at least in part on content of the particular one of the content objects (module 7B40).

System Architecture Overview

Additional System Architecture Examples

Figure 8A:
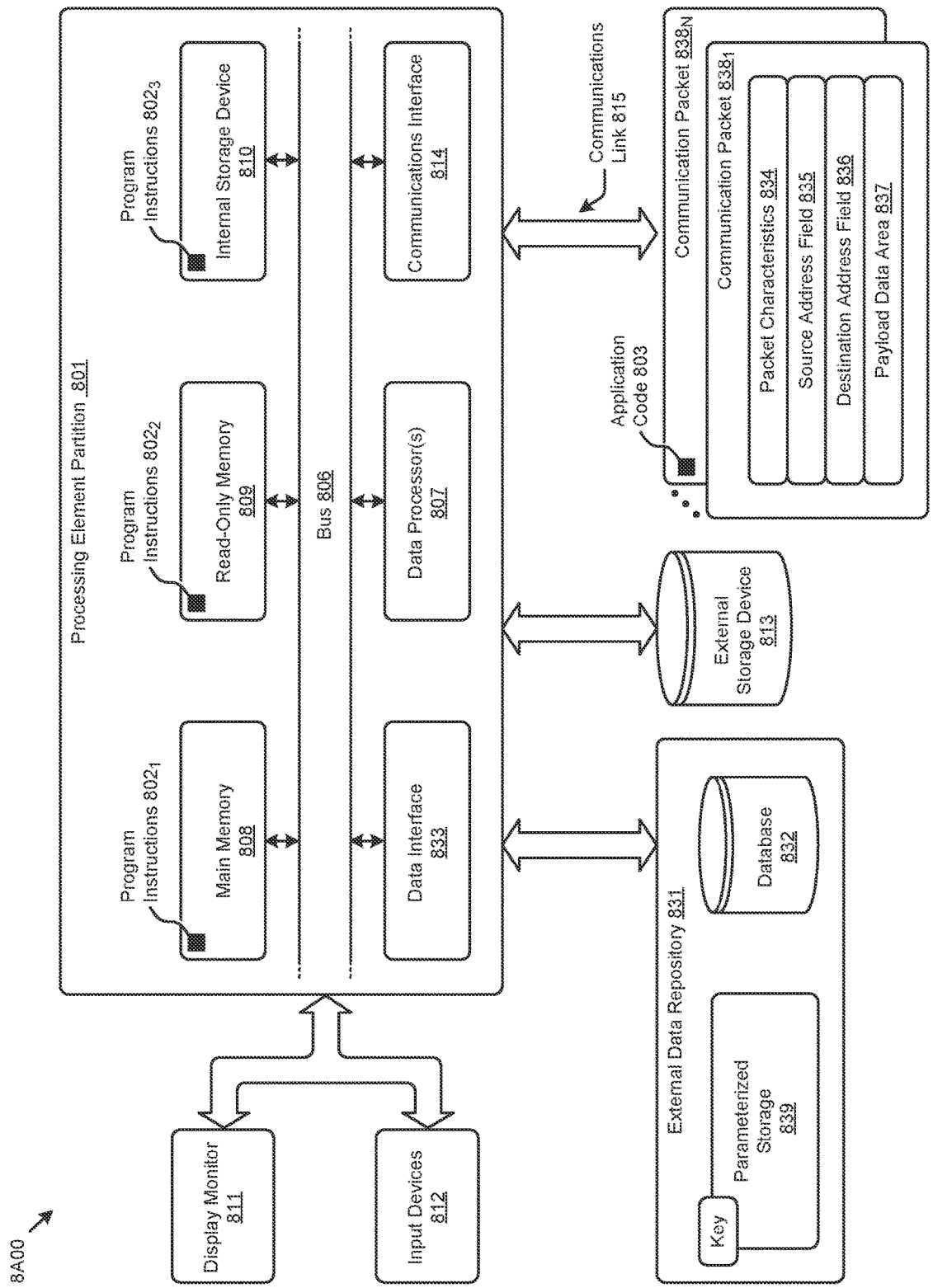
FIG. 8A and FIG. 8B present block diagrams of computer system architectures having components suitable for implementing embodiments of the present disclosure and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. Computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of communications interface 814 may comprise one or more networking ports that are configurable (e.g., pertaining to speed, protocol, physical layer characteristics, media access characteristics, etc.) and any particular instance of communications interface 814 or port thereto can be configured differently from any other particular instance. Portions of a communication protocol can be carried out in whole or in part by any instance of communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

Communications link 815 can be configured to transmit (e.g., send, receive, signal, etc.) any types of communications packets (e.g., communication packet $838_1$, communication packet $838_N$) comprising any organization of data items. The data items can comprise a payload data area 837, a destination address 836 (e.g., a destination IP address), a source address 835 (e.g., a source IP address), and can include various encodings or formatting of bit fields to populate packet characteristics 834. In some cases, the packet characteristics include a version identifier, a packet or payload length, a traffic class, a flow label, etc. In some cases, payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of a computer system 8A00. According to certain embodiments of the disclosure, two or more instances of computer system 8A00 coupled by a communications link 815 (e.g., LAN, public switched telephone network, or wireless network) may perform the sequence of instructions required to practice embodiments of the disclosure using two or more instances of components of computer system 8A00.

Computer system 8A00 may transmit and receive messages such as data and/or instructions organized into a data structure (e.g., communications packets). The data structure can include program instructions (e.g., application code 803), communicated through communications link 815 and communications interface 814. Received program instructions may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

Processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to allowing or denying access to content management system data according to content-based device trust levels. A module may include one or more state machines and/or combinational logic used to implement or facilitate the operational and/or performance characteristics pertaining to allowing or denying access to content management system data according to content-based device trust levels.

Various implementations of database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of allowing or denying access to content management system data according to content-based device trust levels). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to allowing or denying access to content management system data according to content-based device trust levels, and/or for improving the way data is manipulated when performing computerized operations for making access deny/allow decisions.

Figure 8B:
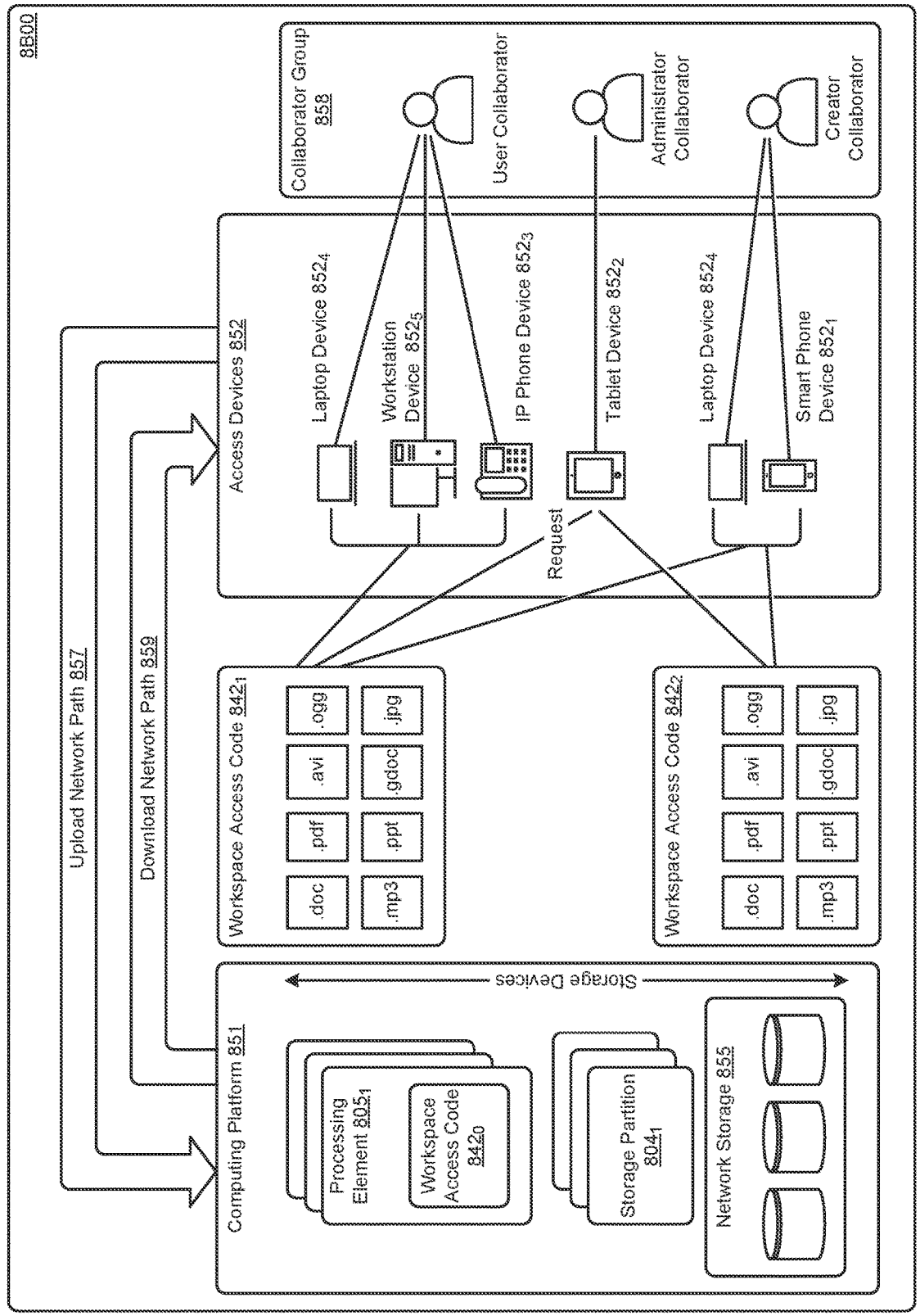

FIG. 8B depicts a block diagram of an instance of a cloud-based environment 8B00.

Such a cloud-based environment supports access to workspaces through the execution of workspace access code (e.g., workspace access code $842_0$, workspace access code $842_1$, and workspace access code $842_2$). Workspace access code can be executed on any of access devices 852 (e.g., laptop device $852_4$, workstation device $852_5$, IP phone device $852_3$, tablet device $852_2$, smart phone device $852_1$, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW_ONLY) may be associated with a first action (e.g., preview), while a second permission (e.g., READ) may be associated with a second action (e.g., download), etc. Furthermore, permissions may be associated to any particular user or any particular group of users.

A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 851, including in a middleware setting. As shown, a portion of the workspace access code resides in and can be executed on one or more processing elements (e.g., processing element $805_1$). The workspace access code can interface with storage devices such as networked storage 855. Storage of workspaces and/or any constituent files or objects, and/or any other code or scripts or data can be stored in any one or more storage partitions (e.g., storage partition $804_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for establishing user device trust levels, the method comprising:

receiving, from a user device, a request to login to a content management system before a request to access a content object of a plurality of content objects, wherein the content management system facilitates interactions between a plurality of user devices and the plurality of content objects, the plurality of user devices being in network communication with the content management system, the content management system includes a trust parameter storage area for storing trust parameters for the plurality of user devices and the plurality of content objects, a device history storage area for storing device histories for the plurality of user devices, a content object storage area for storing the plurality of content objects, and a content object event history storage area for storing content object events, and the trust parameter storage area, the device history storage area, the content object storage area, and the content object event history storage area are separate storage areas of the content management system;

generating device trust values based on an environmental condition and the device history in the device history storage area, wherein at least one of the device trust values are generated in response to the request to login to the content management system received before the request to access the content object, and a device trust parameter list is used to generate the device trust values based on at least environmental parameters;

generating content access trust values based at least in part on content of the content object in the content object storage area or content object event history in the content object event history storage area, wherein the device trust values and content access trust values are stored in the trust parameter storage area, and a content related trust parameter list is used to generate the content access trust values based on at least the content of the content object and the content object event history; and determining whether to grant access rights to access the content object to the user device, wherein a plurality of rules comprising one or more expressions are evaluated based on at least a trust value history to generate a plurality of accumulated results, and the accumulated results are processed to generate a trust posture comprising a plurality of allow or deny indications used to determine whether to allow or deny the request to access the content object, at least by:

evaluating a first expression depending on a first device trust value of the device trust values, and the first expression evaluates to a first Boolean value, evaluating a second expression depending on a first content access trust value of the content access trust values and the second expression evaluates to a second Boolean value, wherein results from evaluating the first and second expressions are used to generate an allow or deny determination for the request to access the content object.

2. The method of claim 1, wherein at least one of the device trust values depend on the environmental condition and a second environmental condition captured after a previous request to login to the content management system generating a respective content access trust value of the content access trust values comprises inspection, by the content management system, of stored bits that comprise the content object.

3. The method of claim 2, further comprising performing a multi-factor authentication challenge before allowing or denying access to the content object and wherein the content object includes at least personally identifiable information and the content object is associated with a security label determined by the inspection of the stored bits of the content object.

4. The method of claim 1, further comprising:

receiving, at the content management system, a second request to access the content object from the user device, wherein the content object was previously stored in local storage of the user device in response to the request to access the content object; and sending, in response to the second request to access the content object, a token from the content management system to the user device, wherein the token provides authorization to access the content object from the local storage of the user device while the user device is offline.

5. A non-transitory computer readable medium having stored thereon a sequence of instructions which, when stored in memory and executed by a processor causes a set of acts for establishing user device trust levels, the set of acts comprising:

receiving, from a user device, a request to login to a content management system before a request to access a content object of a plurality of content objects, wherein the content management system facilitates interactions between a plurality of user devices and the plurality of content objects, the plurality of user devices being in network communication with the content management system, the content management system includes a trust parameter storage area for storing trust parameters for the plurality of user devices and the plurality of content objects, a device history storage area for storing device histories for the plurality of user devices, a content object storage area for storing the plurality of content objects, and a content object event history storage area for storing content object events, and the trust parameter storage area, the device history storage area, the content object storage area, and the content object event history storage area are separate storage areas of the content management system;

generating device trust values based on an environmental condition and the device history in the device history storage area, wherein at least one of the device trust values are generated in response to the request to login to the content management system received before the request to access the content object, and a device trust parameter list is used to generate the device trust values based on at least environmental parameters;

generating content access trust values based at least in part on content of the content object in the content object storage area or content object event history in the content object event history storage area, wherein the device trust values and content access trust values are stored in the trust parameter storage area, and a content related trust parameter list is used to generate the content access trust values based on at least the content of the content object and the content object event history; and determining whether to grant access rights to access the content object to the user device, wherein a plurality of rules comprising one or more expressions are evaluated based on at least a trust value history to generate a plurality of accumulated results, and the accumulated results are processed to generate a trust posture comprising a plurality of allow or deny indications used to determine whether to allow or deny the request to access the content object, at least by:

evaluating a first expression depending on a first device trust value of the device trust values, and the first expression evaluates to a first Boolean value, evaluating a second expression depending on a first content access trust value of the content access trust values and the second expression evaluates to a second Boolean value, wherein results from evaluating the first and second expressions are used to generate an allow or deny determination for the request to access the content object.

6. The non-transitory computer readable medium of claim 5, wherein at least one of the device trust values depend on the environmental condition and a second environmental condition captured after a previous request to login to the content management system generating a respective content access trust value of the content access trust values comprises inspection, by the content management system, of stored bits that comprise the content object.

7. The non-transitory computer readable medium of claim 6, wherein the set of acts further comprise performing a multi-factor authentication challenge before allowing or denying access to the content object and wherein the content object includes at least personally identifiable information and the content object is associated with a security label determined by the inspection of the stored bits of the content object.

8. The non-transitory computer readable medium of claim 5, wherein the set of acts further comprise:

receiving, at the content management system, a second request to access the content object from the user device, wherein the content object was previously stored in local storage of the user device in response to the request to access the content object; and sending, in response to the second request to access the content object, a token from the content management system to the user device, wherein the token provides authorization to access the content object from the local storage of the user device while the user device is offline.

9. A system for establishing user device trust levels, the system comprising:
 a non-transitory storage medium having stored thereon a sequence of instructions; and
 a processor that executes the sequence of instructions to cause a set of acts comprising:
  receiving, from a user device, a request to login to a content management system before a request to access a content object of a plurality of content objects, wherein the content management system facilitates interactions between a plurality of user devices and the plurality of content objects, the plurality of user devices being in network communication with the content management system, the content management system includes a trust parameter storage area for storing trust parameters for the plurality of user devices and the plurality of content objects, a device history storage area for storing device histories for the plurality of user devices, a content object storage area for storing the plurality of content objects, and a content object event history storage area for storing content object events, and the trust parameter storage area, the device history storage area, the content object storage area, and the content object event history storage area are separate storage areas of the content management system;
  generating device trust values based on an environmental condition and the device history in the device history storage area, wherein at least one of the device trust values are generated in response to the request to login to the content management system received before the request to access the content object, and a device trust parameter list is used to generate the device trust values based on at least environmental parameters;
  generating content access trust values based at least in part on content of the content object in the content object storage area or content object event history in the content object event history storage area, wherein the device trust values and content access trust values are stored in the trust parameter storage area, and a content related trust parameter list is used to generate the content access trust values based on at least the content of the content object and the content object event history; and
  determining whether to grant access rights to access the content object to the user device, wherein a plurality of rules comprising one or more expressions are evaluated based on at least a trust value history to generate a plurality of accumulated results, and the accumulated results are processed to generate a trust posture comprising a plurality of allow or deny indications used to determine whether to allow or deny the request to access the content object, at least by:
   evaluating a first expression depending on a first device trust value of the device trust values, and the first expression evaluates to a first Boolean value,
   evaluating a second expression depending on a first content access trust value of the content access trust values and the second expression evaluates to a second Boolean value,
   wherein results from evaluating the first and second expressions are used to generate an allow or deny determination for the request to access the content object.

10. The system of claim 9, wherein at least one of the device trust values depend on the environmental condition and a second environmental condition captured after a previous request to login to the content management system generating a respective content access trust value of the content access trust values comprises inspection, by the content management system, of stored bits that comprise the content object.

11. The system of claim 10, further comprising performing a multi-factor authentication challenge before allowing or denying access to the content object and wherein the content object includes at least personally identifiable information and the content object is associated with a security label determined by the inspection of the stored bits of the content object.

12. The system of claim 9, wherein the set of acts further comprise:
 receiving, at the content management system, a second request to access the content object from the user device, wherein the content object was previously stored in local storage of the user device in response to the request to access the content object; and
 sending, in response to the second request to access the content object, a token from the content management system to the user device, wherein the token provides authorization to access the content object from the local storage of the user device while the user device is offline.

13. A method for establishing user device trust levels, the method comprising:
 receiving, from a user device, a request to login to a content management system before a request to access a content object of a plurality of content objects, wherein the content management system facilitates interactions between a plurality of user devices and the plurality of content objects, the plurality of user devices being in network communication with the content management system, the content management system includes a device history storage area for storing device histories for the plurality of user devices, a content object storage area for storing the plurality of content objects, and a content object event history storage area for storing content object events, and the device history storage area, the content object storage area, and the content object event history storage area are separate storage areas of the content management system;
 generating device trust values based on an environmental condition and the device history in the device history storage area, wherein at least one of the device trust values are generated in response to the request to login to the content management system received before the request to access the content object;
 generating content access trust values based at least in part on content of the content object in the content object storage area or content object event history in the content object event history storage area;
 determining whether to grant access rights to access the content object to the user device by:

evaluating a first expression depending on a first device trust value of the device trust values, and the first expression evaluates to a first Boolean value, evaluating a second expression depending on a first content access trust value of the content access trust values and the second expression evaluates to a second Boolean value, wherein results from evaluating the first and second expressions are used to generate an allow or deny determination for the request to access the content object;

receiving, at the content management system, a second request to access the content object from the user device, wherein the content object was previously stored in local storage of the user device in response to the request to access the content object; and sending, in response to the second request to access the content object, a token from the content management system to the user device, wherein the token provides authorization to access the content object from the local storage of the user device while the user device is offline.

14. The method of claim 13, wherein at least one of the device trust values depend on the environmental condition and a second environmental condition captured after a previous request to login to the content management system generating a respective content access trust value of the content access trust values comprises inspection, by the content management system, of stored bits that comprise the content object.

15. The method of claim 14, further comprising performing a multi-factor authentication challenge before allowing or denying access to the content object and wherein the content object includes at least personally identifiable information and the content object is associated with a security label determined by the inspection of the stored bits of the content object.

16. The method of claim 13, wherein:
the content management system includes a trust parameter storage area for storing trust parameters for the plurality of user devices and the plurality of content objects,
the trust parameter storage area is a separate from the device history storage area, the content object storage area, and the content object event history storage area, and
the device trust values and content access trust values are stored in the trust parameter storage area.

17. The method of claim 16, wherein a device trust parameter list is used to generate the device trust values based on at least environmental parameters, and a content related trust parameter list is used to generate the content access trust values based on at least the content of the content object and the content object event history.

18. A non-transitory computer readable medium having stored thereon a sequence of instructions which, when stored in memory and executed by a processor causes a set of acts for establishing user device trust levels, the set of acts comprising:
receiving, from a user device, a request to login to a content management system before a request to access a content object of a plurality of content objects, wherein the content management system facilitates interactions between a plurality of user devices and the plurality of content objects, the plurality of user devices being in network communication with the content management system, the content management system includes a device history storage area for storing device histories for the plurality of user devices, a content object storage area for storing the plurality of content objects, and a content object event history storage area for storing content object events, and the device history storage area, the content object storage area, and the content object event history storage area are separate storage areas of the content management system;

generating device trust values based on an environmental condition and the device history in the device history storage area, wherein at least one of the device trust values are generated in response to the request to login to the content management system received before the request to access the content object;

generating content access trust values based at least in part on content of the content object in the content object storage area or content object event history in the content object event history storage area;

determining whether to grant access rights to access the content object to the user device by:
evaluating a first expression depending on a first device trust value of the device trust values, and the first expression evaluates to a first Boolean value,
evaluating a second expression depending on a first content access trust value of the content access trust values and the second expression evaluates to a second Boolean value,
wherein results from evaluating the first and second expressions are used to generate an allow or deny determination for the request to access the content object;

receiving, at the content management system, a second request to access the content object from the user device, wherein the content object was previously stored in local storage of the user device in response to the request to access the content object; and sending, in response to the second request to access the content object, a token from the content management system to the user device, wherein the token provides authorization to access the content object from the local storage of the user device while the user device is offline.

19. The non-transitory computer readable medium of claim 18, wherein at least one of the device trust values depend on the environmental condition and a second environmental condition captured after a previous request to login to the content management system generating a respective content access trust value of the content access trust values comprises inspection, by the content management system, of stored bits that comprise the content object.

20. The non-transitory computer readable medium of claim 19, wherein the set of acts further comprise performing a multi-factor authentication challenge before allowing or denying access to the content object and wherein the content object includes at least personally identifiable information and the content object is associated with a security label determined by the inspection of the stored bits of the content object.

21. The non-transitory computer readable medium of claim 18, wherein:
the content management system includes a trust parameter storage area for storing trust parameters for the plurality of user devices and the plurality of content objects,
the trust parameter storage area is a separate from the device history storage area, the content object storage area, and the content object event history storage area, and the device trust values and content access trust values are stored in the trust parameter storage area.

22. The non-transitory computer readable medium of claim 21, wherein a device trust parameter list is used to generate the device trust values based on at least environmental parameters, and a content related trust parameter list is used to generate the content access trust values based on at least the content of the content object and the content object event history.

* * * * *